United States Patent
Bryant, II

(10) Patent No.: US 8,256,789 B2
(45) Date of Patent: Sep. 4, 2012

(54) DEVICE FOR GUIDING A BOAT ON A TRAILER

(76) Inventor: Charles E. Bryant, II, Sultan, WA (US)

( * ) Notice: Subject to any disclaimer, the term of this patent is extended or adjusted under 35 U.S.C. 154(b) by 0 days.

(21) Appl. No.: 12/398,668

(22) Filed: Mar. 5, 2009

(65) Prior Publication Data

US 2009/0302572 A1  Dec. 10, 2009

Related U.S. Application Data

(60) Provisional application No. 61/033,937, filed on Mar. 5, 2008.

(51) Int. Cl.
*B60P 3/10* (2006.01)
(52) U.S. Cl. ........................ 280/414.1; 414/532; 414/529
(58) Field of Classification Search ............... 280/414.1; 414/532, 529
See application file for complete search history.

(56) References Cited

U.S. PATENT DOCUMENTS

| | | | |
|---|---|---|---|
| 3,077,277 A | 2/1963 | Holzman | 214/84 |
| 3,447,815 A * | 6/1969 | West | 280/144 |
| 3,889,973 A * | 6/1975 | Fehseke | 224/401 |
| 4,138,135 A | 2/1979 | Hewitt | 280/414 R |
| 4,268,211 A * | 5/1981 | Schwebke | 414/535 |
| D288,795 S * | 3/1987 | Toppero, Jr. | D12/106 |
| 5,013,206 A * | 5/1991 | Ernst et al. | 414/483 |
| 5,108,121 A * | 4/1992 | Collis | 280/414.1 |
| 5,195,767 A * | 3/1993 | Des Roches | 280/414.1 |
| 5,360,226 A * | 11/1994 | Gussler et al. | 280/414.1 |
| 6,616,166 B2 * | 9/2003 | Marchese | 280/414.1 |
| 7,621,506 B2 * | 11/2009 | Ebbenga | 254/278 |

* cited by examiner

*Primary Examiner* — Paul N Dickson
*Assistant Examiner* — Marlon A Arce
(74) *Attorney, Agent, or Firm* — Seed IP Law Group PLLC

(57) ABSTRACT

A device for guiding a boat onto a trailer, the trailer having at least two longitudinal side rails, the device including a mounting assembly for attachment to a side rail to provide for transverse adjustment relative to the side rail's longitudinal axis and a bumper assembly attached to the mounting assembly and having at least one bumper mechanism that moves between an engaged position in which the device guides the boat into an aligned position on the trailer and a disengaged position in which the bumper mechanism is moved away from the boat to avoid contact with the boat.

22 Claims, 28 Drawing Sheets

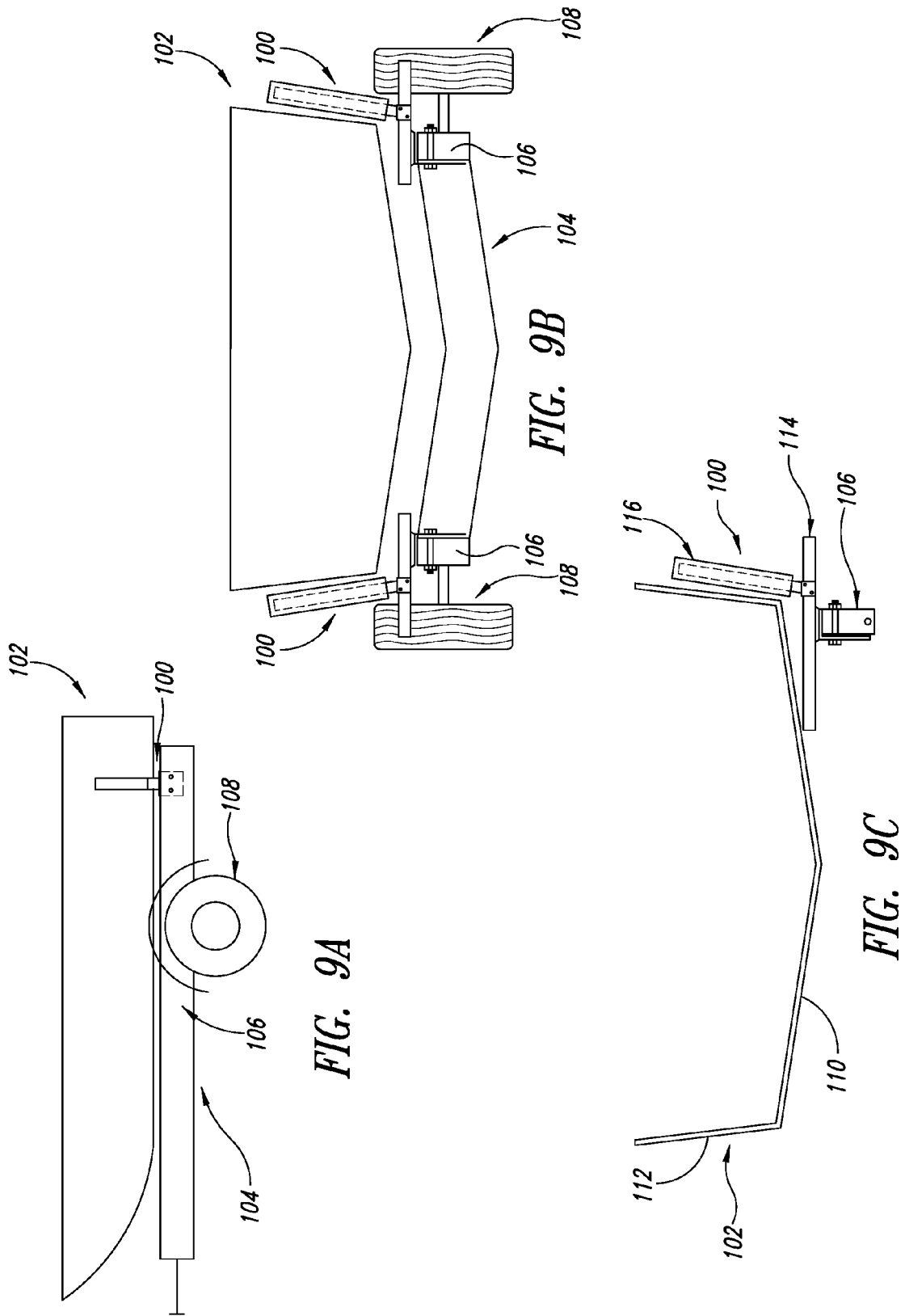

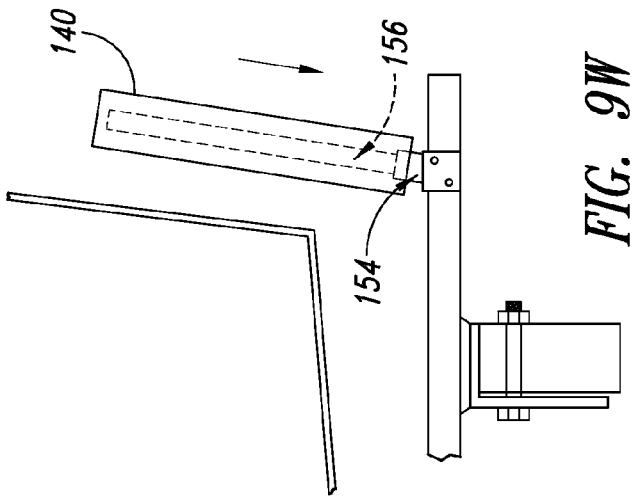
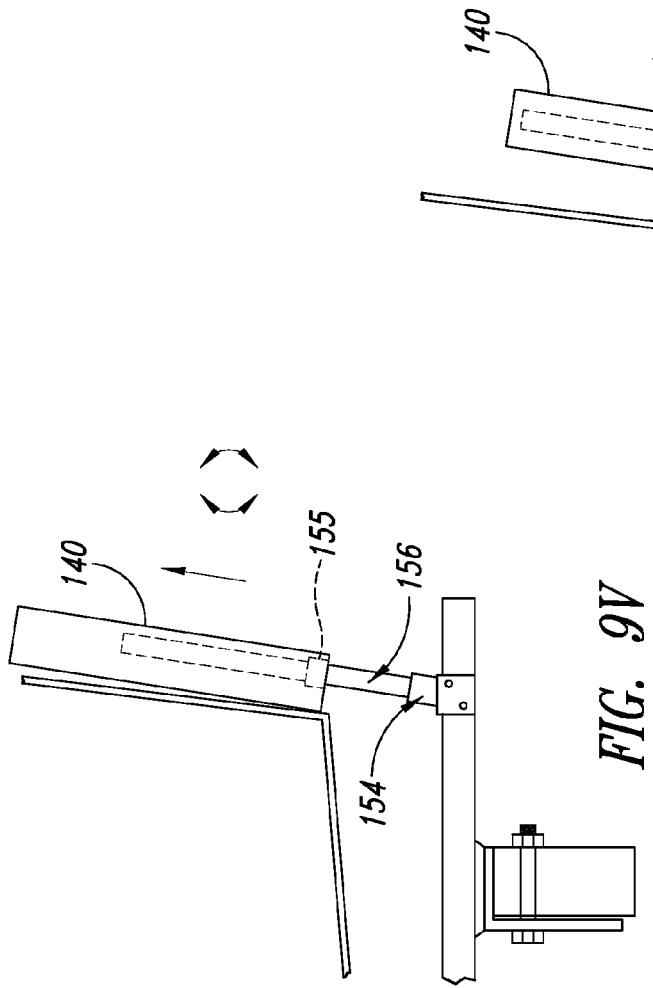
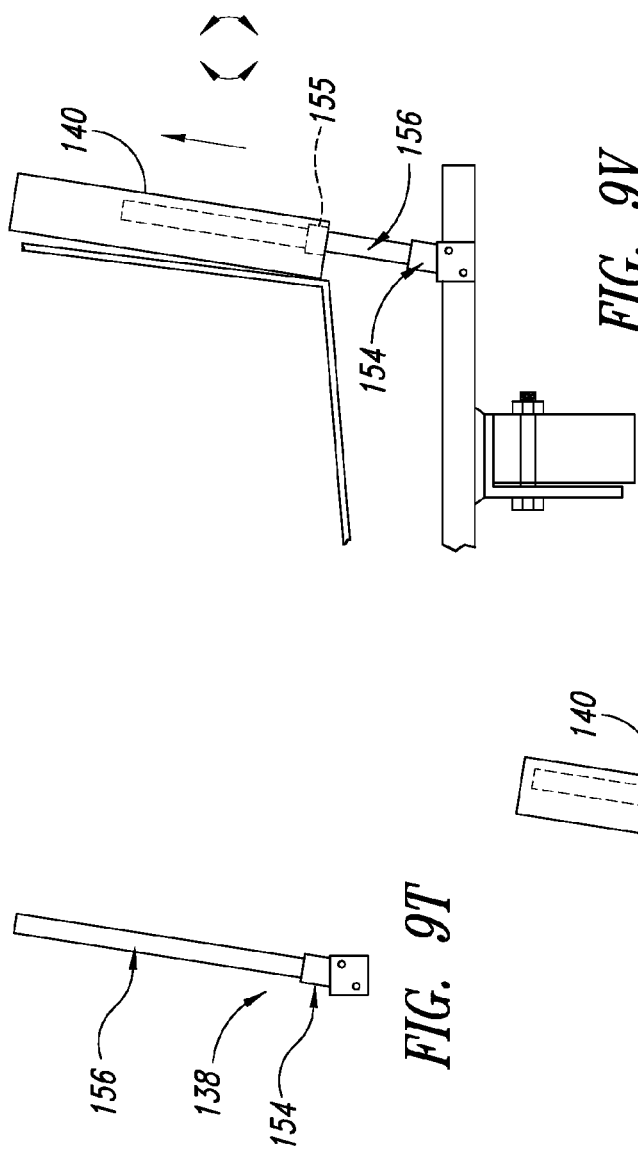
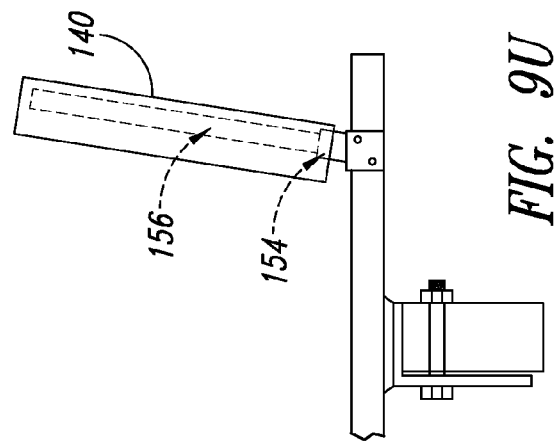

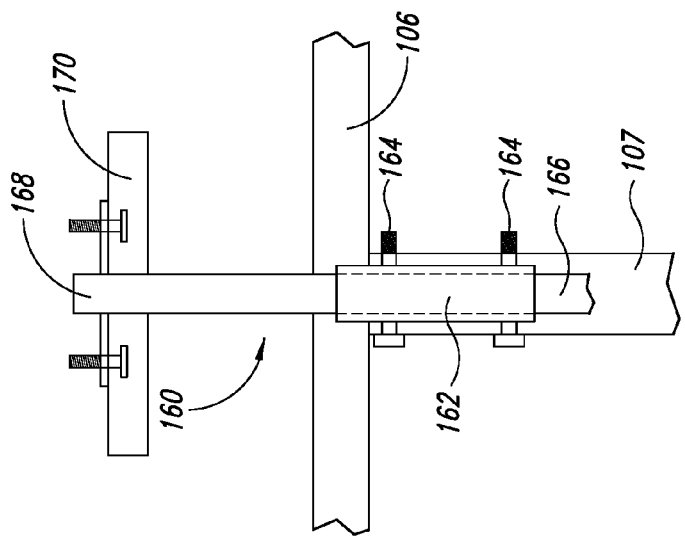
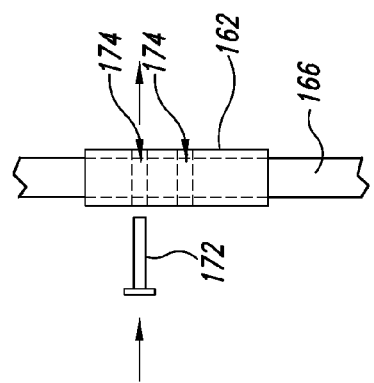
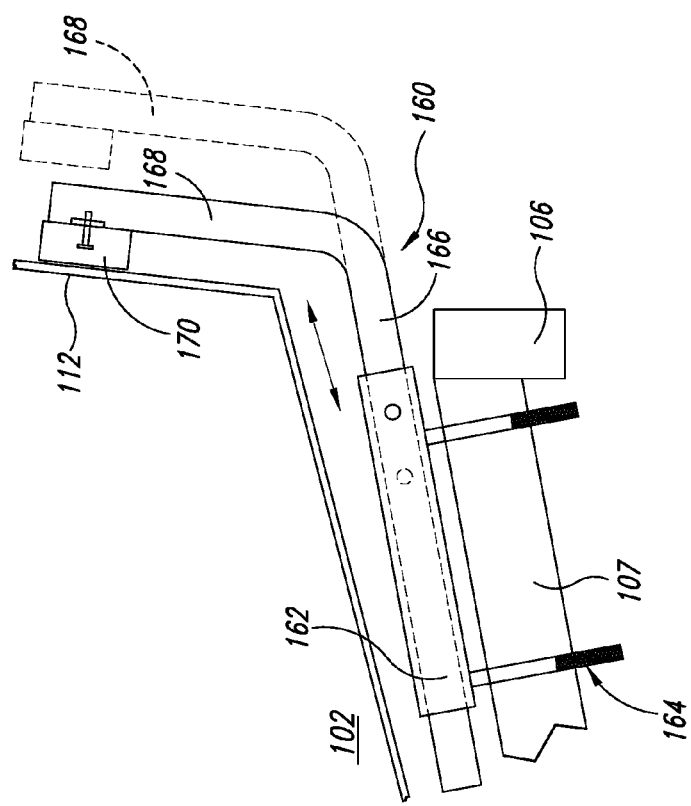
FIG. 10A
FIG. 10B
FIG. 10C

DEVICE FOR GUIDING A BOAT ON A TRAILER

BACKGROUND

1. Technical Field

The present disclosure pertains to devices to assist in loading a boat on a trailer and, more particularly, to a device that automatically centers a boat laterally on a trailer during the loading operation and that is adaptable to existing trailers.

2. Description of the Related Art

Most recreational boats are stored and transported on a trailer that is towed by a personally owned vehicle. Proper positioning of the boat on the trailer is critical to the safe movement of the trailer on the highways. For example, positioning the boat too far to the rear of the trailer will cause the trailer to fishtail and it will raise the rear end of the tow vehicle, reducing traction from the tow vehicle wheels. Positioning the boat too far forward on the trailer will cause too much weight on the hitch, which will drag the rear of the tow vehicle down and make steering more difficult.

Lateral positioning of the boat on the trailer is also critical, not only for safe transportation, launching, and recovery, but also for protecting the hull of the boat. As shown in FIG. 1, most trailers 100 typically have a longitudinal center rail 102 on which are mounted keel rollers 104 for supporting the keel of a boat. The trailer 100 also includes side rails 106, generally parallel to the center rail 102. The side rails 106 typically have bunks 108 or rollers (not shown) or a combination of bunks 108 and rollers for cushioning and stabilizing the boat hull. The exact configuration of the trailer will depend on the type of boat hull.

In some cases, an all-roller trailer is useful for boats having a center keel and left and right sponsons. Alignment of the sponsons with the cradle rollers on the side rails is important to properly support the boat and avoid damage to the hull.

Loading a keel roller trailer requires some skill and agility. With the boat floating near a dock, the trailer is positioned in the water so that the boat and the trailer have their longitudinal axes in general alignment. A winch line is attached to the bow eye on the bow of the boat and the boat is winched onto the trailer with the rollers supporting most or the entire load of the boat. Ideally the boat will remain in alignment with the center rollers. However, wind and waves can cause a boat to easily move off the rollers, requiring quick continual action on the part of those loading the boat. Under less than ideal conditions, this will be a difficult task for an individual to perform alone.

Recently, a new style of trailer has been designed that consists of only bunks and no rollers. In some of these designs, a single vestigial keel roller is located at the stern end of the trailer to deflect the boat upward onto the bunks when loading. Once the boat is fully winched onto the trailer, the stern of the boat no longer contacts the keel roller. Thus, the entire weight of the boat is supported on the bunks and not on the rollers. One disadvantage of this design is that the bunks provide little support for the transom area where the greatest weight of the boat is found, i.e., the engine and fuel. This can place a substantial amount of load on the hull of the boat, which functions as a cantilever to hold up the transom. Because the low-profile trailers are almost completely submerged, the boats are essentiality floated onto the trailer. There is little or no winching of the boat up the trailer because of the substantial friction that would result between the boat hull and the carpeted bunks. Lateral and longitudinal alignment of the boat on the trailer is sometimes more difficult with the float-on trailer design.

Numerous designs have been proposed to assist in loading a boat onto a trailer so that the boat is centered with respect to the trailer, both longitudinally and laterally. For example, U.S. Pat. No. 3,077,277 describes a boat trailer that includes a central roller and a pair of outside rollers that are supported on angularly shaped members that are pivoted on pivot pins. Distal rollers are described as being held in a down position against the trailer by weight and are pushed into engagement with the boat hull as the boat keel bears down on a roller that joins two mutually-opposed arms. Because these arms are coupled together through the single roller, the keel of the boat must bear down on the central roller in order to activate the arms. Hitting only one of the arms will not cause either of the arms to move the hull to a centered position.

In U.S. Pat. No. 4,138,135, a boat trailer is described having a wheeled frame with a tongue extending from a forward end thereof. A boat support is provided on the frame between the opposing sides for supporting the bottom portion of a boat. A pair of spaced-apart arms is pivotally secured to the frame at one side thereof and extends upwardly. A guide rail is secured to and extends between the upper ends of the pair of arms for engagement with one side of the boat. A spring is connected to each of the arms for yieldably urging the guide rail towards the center of the trailer and into engagement with the side of the boat. A second pair of arms is secured to the frame on the other side thereof and extends upwardly therefrom with a second guide rail secured to the upper ends thereof. Thus, the pair of arms in this design are pivotally mounted on the trailer frame and biased towards the center of the trailer by undercarriage springs at a free end of the arms. A boat loading onto this trailer will contact the arms along the side of the hull and scrape against the guide rails as the boat is winched onto the trailer. In addition, the guide rails remain in contact with the boat as the boat is transported, causing wear and chafing on the boat hull.

Hence, there is a need for a mechanically-simple device that automatically centers a boat on a trailer without causing damage to the hull and that is easily adaptable to existing trailers.

BRIEF SUMMARY

A boat centering device and assembly are provided in the embodiments of the disclosure described herein.

In accordance with one embodiment of the present disclosure, a device for guiding a boat onto a trailer is provided, the trailer having at least two longitudinal side rails. The device includes a mounting assembly adapted for attachment to one of the side rails and to provide for transverse adjustment relative to the side rail's longitudinal axis; and a bumper assembly attachable to the mounting assembly and having at least one bumper mechanism configured to move between an engaged position, in which the device is adapted to guide the boat into an aligned position on the trailer, and a disengaged position, in which the bumper mechanism is adapted to be moved away from the boat.

In accordance with one aspect of the foregoing embodiment, the bumper mechanism moves horizontally for transverse movement relative to the longitudinal axis of the side rails. For example, the bumper mechanism can include at least one roller mounted on a bracket that translates along a horizontal axis that is transverse to the longitudinal axis of the side rail. It can be perpendicular or within a range of angles depending upon the configuration of the side rail. As another example, the bumper mechanism can include one or more shock absorbing members, such as pads, bumpers, and the like mounted on the bracket to move as described above.

In accordance with another aspect of the foregoing embodiment, the bumper mechanism rotates about a vertical axis. In this embodiment, the bumper mechanism can include a tube slideably mounted over a vertical post, the tube adapted to rotate around the post between the engaged and disengaged positions. Alternatively, at least one roller bumper can be mounted on a bracket that is rotatably mounted on a vertical post to rotate between the engaged and disengaged positions. In accordance with another aspect, the bumper has one end mounted for pivotal movement to move a second end between the engaged and disengaged positions. In yet another aspect, a rail is mounted to at least one vertical post to translate longitudinally and move horizontally between the engaged and disengaged positions.

In accordance with another aspect of the foregoing embodiment, the bumper mechanism pivots about a horizontal axis. In other words, one end is mounted to pivot about a horizontal axis to move a second end into and out of the engaged position or between the engaged and disengaged positions.

In accordance with another embodiment of the present disclosure, a trailer is provided that includes a device for guiding a boat on the trailer, the trailer having at least two longitudinal side rails. The device is configured in accordance with the foregoing embodiments described above.

In another embodiment, a boat centering device for a trailer is provided. The device includes a lever arm having a first end and a second end, the lever arm adapted to be mounted on a mount on the trailer. Ideally, the lever arm rotates about an axis substantially parallel to the longitudinal axis of the trailer. A contact member is mounted on the first end of the lever arm and configured to be contacted by the boat, and an outrigger is mounted on the second end of the lever arm, the outrigger adapted to urge the boat towards the longitudinal axis of the trailer when the contact member is in contact with the boat and to not contact the boat when the boat is centered on the trailer. Ideally, a biasing member is adapted to rotate the lever arm in a direction that will move the contact member upward when the contact member is not in contact with the boat hull. In accordance with an aspect of the forgoing embodiment, the biasing member includes a torsion spring.

In accordance with a further aspect of the forgoing embodiment, the contact member includes a support post having a first end adapted for attachment to the first end of the lever arm and a second end adapted for attachment to a bumper, the bumper mounted at an angle on the support post.

In accordance with another aspect of the forgoing embodiment, the outrigger includes a bumper having a first side adapted for attachment to the outrigger and a second side adapted for contact with the boat. Ideally, the bumper includes wedges adapted to expand and contract.

In accordance with yet a further aspect of the forgoing embodiment, the support post is adjustable in length.

In accordance with yet another aspect of the forgoing embodiment, a length between the mount and the first end of the lever arm is a first length and a length between the second end of the lever arm and the mount is a second length, and the first length is greater than the second length. Ideally, the first length and the second length are independently or dependently adjustable.

In another embodiment of the present disclosure, a boat centering assembly for a trailer is provided. The assembly includes at least two independent lever arms, each lever arm having a first end and a second end, the lever arms adapted to rotate in a plane that is perpendicular to the longitudinal axis of the trailer; at least two bearing members on the first end of each lever arm and configured to rotate the lever arm when contacted by the boat hull; at least two outriggers mounted on the second end of each lever arm and configured to urge the boat towards the center of the trailer when each lever arm rotates in a first direction; and a respective biasing member associated with each lever arm that biases each lever arm to rotate in a second direction to move the outrigger away from the boat hull when the boat is centered on the trailer. Ideally, the biasing member includes a torsion spring.

In accordance with a further aspect of the forgoing embodiment, the at least two bearing members include a support post having a first end adapted for attachment to the first end of the lever arm, and a second end adapted for attachment to a bumper, the bumper mounted at an angle on the support post.

In yet another embodiment of the present disclosure, a method for centering a boat on a trailer is provided. The method includes biasing a lever arm in a first position away from the center of the trailer; moving the boat closer to the trailer so that the lever arm rotates a second end of the lever arm away from the first position to a second position towards the boat to center the boat with respect to the trailer; and fully resting the boat in a laterally centered position on the trailer and in contact with the first end of the lever arm (e.g., via a contact member) and not in contact with the second end of the lever arm.

In accordance with a further embodiment of the present disclosure, a boat centering assembly for a trailer is provided. The assembly includes a device for rotating about an axis substantially parallel to the longitudinal axis of the trailer; a device for contacting the boat, the contacting device mounted on the rotating device; and a device for urging the boat towards the longitudinal axis of the trailer when the contacting device is in contact with the boat and to not contact the boat when the boat is centered on the trailer, the urging device mounted on the rotating device.

In accordance with a further aspect of the forgoing embodiment, a device is provided for biasing the urging device in a direction that will move the contacting device upwards when the contacting device is not in contact with the boat. Ideally, the biasing device includes a torsion spring.

In accordance with yet a further aspect of the forgoing embodiment, the contacting device includes a support post having a first end adapted for attachment to the first end of the lever arm, and a second end adapted for attachment to a bumper, the bumper mounted at an angle on the support post.

In another embodiment of the present disclosure, an improved boat trailer is provided, the boat trailer having a frame, at least one cross member, at least one bunk mounted to the at least one cross member, at least one axle, a plurality of wheels attached to the at least one axle, a hitch assembly attached to the frame is provided. The improvement includes at least two lever arms, each lever arm having a first end and a second end. Preferably, the lever arms are adapted to rotate in a plane that is substantially perpendicular to the longitudinal axis of the trailer. The improvement further includes at least one bearing member, on the first end of each lever arm, and configured to rotate the lever arm when contacted by the boat hull; at least one outrigger mounted on the second end of each lever arm and configured to urge the boat towards the center of the trailer when each lever arm rotates in a first direction; and a respective biasing member associated with each lever arm that biases each lever arm to rotate in a second direction to move the outrigger away from the boat hull when the boat is centered on the trailer.

In yet a further embodiment of the present disclosure, a kit that adapts a boat trailer to self-center a boat hull on the trailer is provided. The kit includes at least two lever arms adapted for pivotal connection to the trailer to move independently about an axis that is substantially parallel to a longitudinal axis of the trailer, each lever arm having at least one mounting opening, a first end, and a second end; a first contact member adapted for attachment to the first end of the lever arm and structured for contact with a bottom of the boat hull; a second contact member adapted to be attached to the second end of the lever arm and structured to bear against a side of the boat hull; and a mounting assembly for mounting each lever arm independently to the trailer frame, the mounting assembly including a biasing member for urging the lever arm to independently rotate in a direction that moves the second contact member away from a longitudinal axis of the trailer.

In accordance with a further aspect of the forgoing embodiment, the mounting assembly includes at least one axle for each of the at least two lever arms, the axle adapted to be attached to the trailer and to receive the mounting opening of the corresponding lever arm, and the biasing member comprising a torsion spring. Ideally, a retaining member is provided for each of the at least two lever arms and adapted to hold each lever arm in a position where the lever arm is rotated towards the longitudinal axis of the trailer.

In accordance with yet another aspect of the forgoing embodiment, a distance between the first end and the mounting opening includes a first length and a distance between the second end and the mounting opening includes a second length, wherein the first length is greater than the second length.

As will be readily appreciated form the foregoing, the disclosed embodiments of the present disclosure provide a new device for centering a boat on a trailer frame and correct the issues listed above. In particular, the lever arm is biased to rotate the outrigger outward and away from the boat hull. The outrigger does not contact the boat when the boat is centered on the trailer. This feature prevents scraping along the boat hull when the boat is being loaded on the trailer and further prevents damage to the hull during transport.

The device is also designed to accommodate boat hulls of various shapes and sizes. In particular, the length of the lever arm and the contact member may be adjustable and further provide the lever arm the ability to achieve a greater mechanical advantage when the boat hull shape and size allow.

Additionally, the device is easily adaptable to existing trailers. In accordance with one embodiment of the present disclosure, the device is provided in a kit that allows installation of the device to any conventional boat trailer. This embodiment further allows the user to choose the number of devices to install based on preference and the shape and size of the boat. Thus the new design provides improved flexibility while providing effective centering of a boat on a trailer.

BRIEF DESCRIPTION OF THE SEVERAL VIEWS OF THE DRAWINGS

FIGS. 9A-9C are side, back, and enlarged back views, respectively, of a boat and trailer utilizing a boat centering device formed in accordance with another embodiment of the present disclosure.

FIGS. 9Q-9U are top, side, and rear views, respectively, of a second embodiment of the bumper mechanism, and FIGS. 9V and 9W are rear views illustrating movement of this embodiment of the bumper mechanism relative to the boat and the trailer between the engaged and disengaged positions.

FIGS. 10A-10D are side, top, top, and side views, respectively, of a further alternative embodiment of the present disclosure relative to the trailer and the boat.

DETAILED DESCRIPTION

Figure 1:
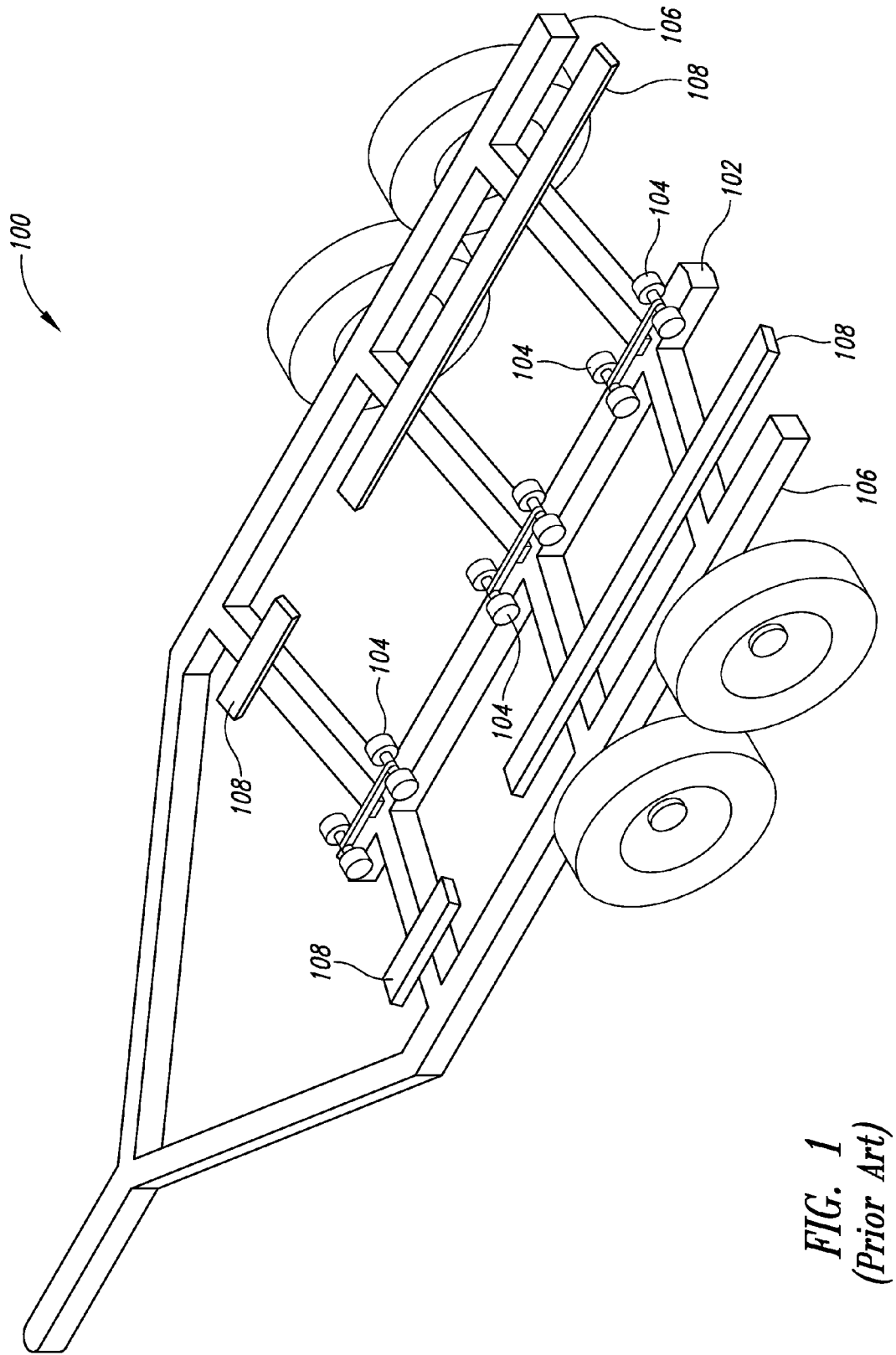
FIG. 1 is an isometric view of a conventional boat trailer.
Figure 2:
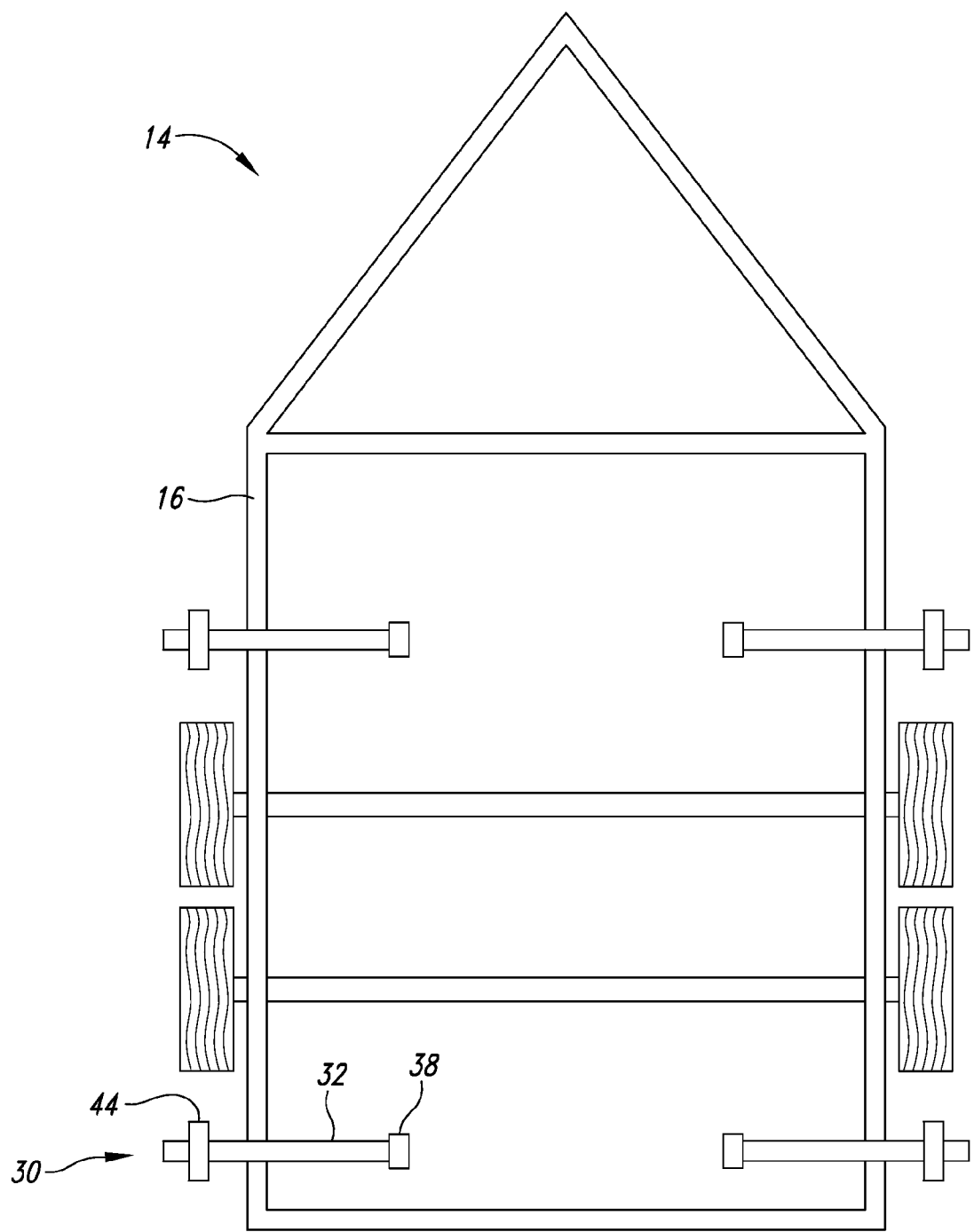
FIG. 2 is a top view of a conventional boat trailer modified to include a boat centering assembly formed in accordance with one embodiment of the present disclosure.

A representative embodiment of the present disclosure will now be described in conjunction with FIGS. 2-8. FIG. 2 shows a boat trailer 14 with a trailer frame 16 modified to include a boat centering assembly 30, according to one embodiment of the present disclosure. The boat centering assembly 30 includes four of the devices 30 mounted on opposite sides of the trailer frame 16. The front two devices 30 ensure centering of the bow while the rear two devices 30 ensure centering of the stern. It is preferred, in one embodiment, that for boats sixteen feet and longer, at least four of the devices 30 be used in order to ensure efficient centering of the boat 10 on the trailer 14. However, it is understood that any number of the device 30 will center the boat 10. For example, a single device 30, an assembly of at least two devices 30, or an assembly of four or more devices 30 can all be used, depending on the type of boat 10, the size of the trailer 14, and user preference.

In one embodiment, the boat centering device 30 may be in a kit form to adapt a trailer 14 to become self-centering. In another embodiment, the boat centering device 30 may be manufactured as an integral component of the trailer 14.

Figure 3A:
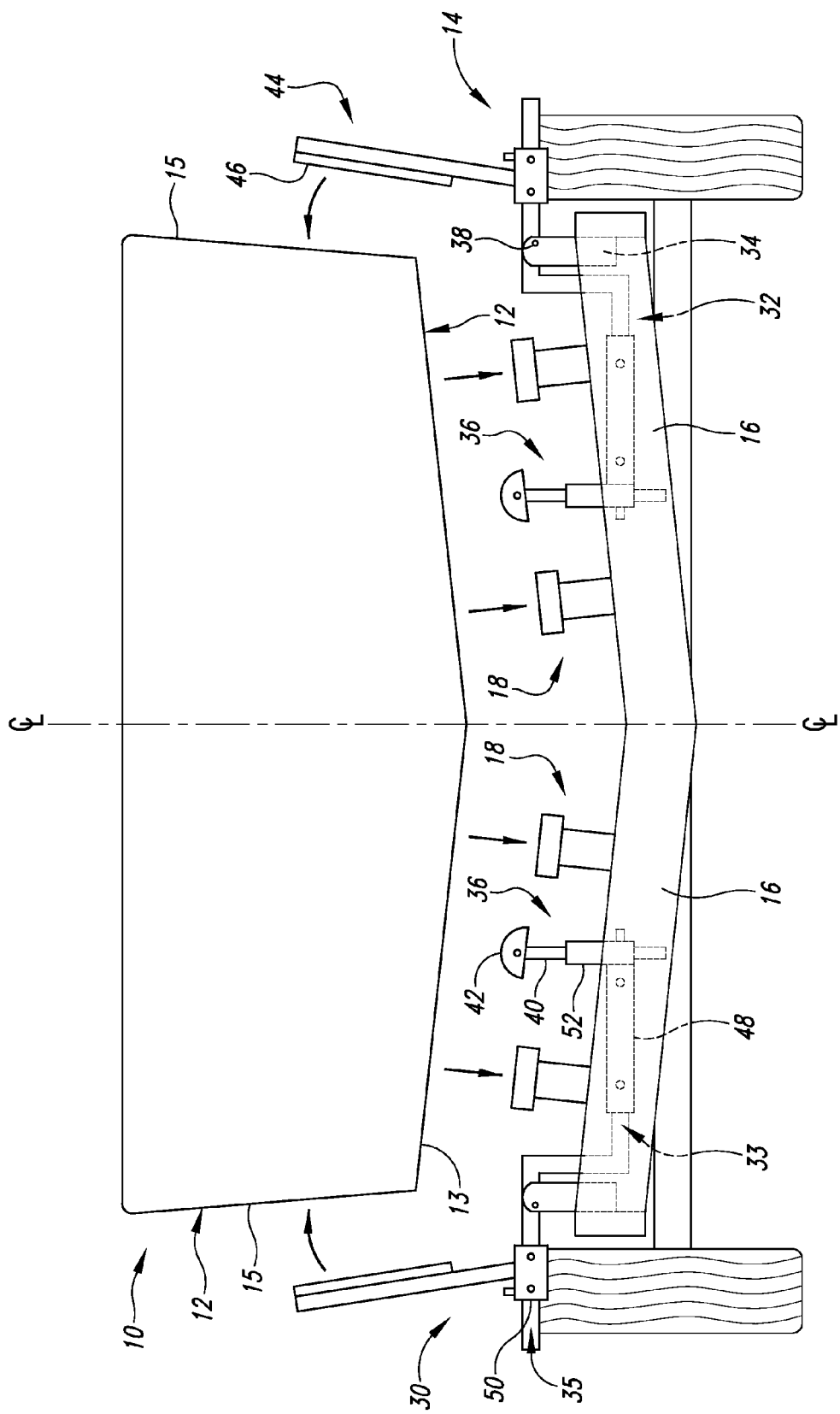
FIGS. 3A-3B are end views of a conventional trailer adapted to include a boat centering assembly, in accordance with one embodiment of the present disclosure, when the boat is floating above the trailer and when the boat is fully rested on the trailer respectfully.
Figure 3B:
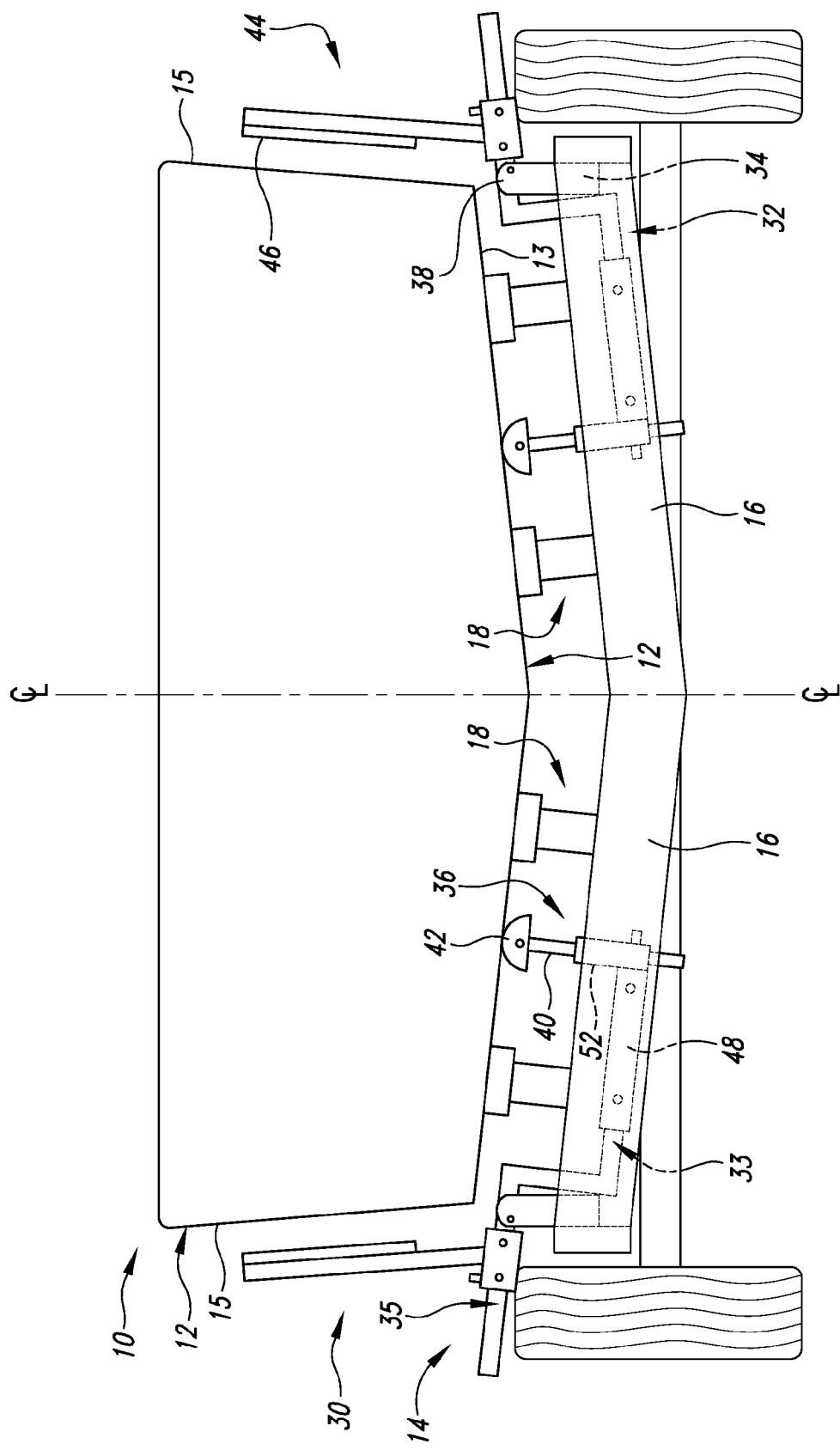

FIG. 3A and FIG. 3B show one embodiment of the disclosure where a boat centering assembly 30 is used on the boat trailer 14 to guide the boat 10 having a hull 12 onto the trailer 14. In FIG. 3A, the boat 10 is floating above the trailer 14 in water. In FIG. 3B, the boat 10 is fully resting on the bunks 18. The boat centering assembly 30 includes at least two lever arms 32 that are mounted to the trailer 14. Preferably, each lever arm 32 rotates in a plane that is approximately perpendicular to the longitudinal axis of the trailer 14 and towards the center of the trailer frame 16. Contact members 36 are attached to a first end 33 of each lever arm 32 while outriggers 44 are mounted on a second end 35. When a bottom 13 of the boat hull 12 bears against the contact member 36, the lever arm 32 will rotate. The second end 35 of each lever arm 32 is thus rotated towards the center of the trailer 14 so that the outriggers 44 move towards each other, and at least one of the outriggers 44 will contact a side 15 of the hull 12 to urge the boat 10 towards the center of the trailer 14. In other words, when the boat 10 is positioned off center and towards one side of the trailer 14, the outrigger 44 on that side of the trailer 14 will contact the hull 12 and urge the hull 12 to move back towards the center of the trailer 14.

Biasing members 38 are associated with each lever arm 32 to bias the lever arms 32 to rotate the outriggers 44 away from each other. Ideally, in one embodiment, the outriggers 44 are configured to not contact the boat hull 12 when the boat 10 is centered and resting on the trailer 14. For example, when the boat 10 is centered and resting on the trailer 14, each outrigger 44 will be spaced away from the side of the boat hull 12 a distance in the range of ¾ inch to 1.5 inches, and preferably about one inch. Thus, for a hull that is 79 inches in width, the outriggers will be separated approximately in the range of 80.5 inches to 82 inches and preferably about 81 inches. This will prevent rubbing of the outrigger 44 against the hull 12 while in transport.

In one embodiment, the biasing members 38 rotate the lever arms 32 in such a direction as to cause the outriggers 44 to move away from the center of the trailer 14 and over the edge of the trailer frame 16 when the boat 10 is not in contact with the contact members 36. Preferably, the outriggers 44 are angled away from the boat 10 at about eighteen degrees from the vertical edge of the trailer frame 16. However, it is understood that other angles may be used.

Figure 4:
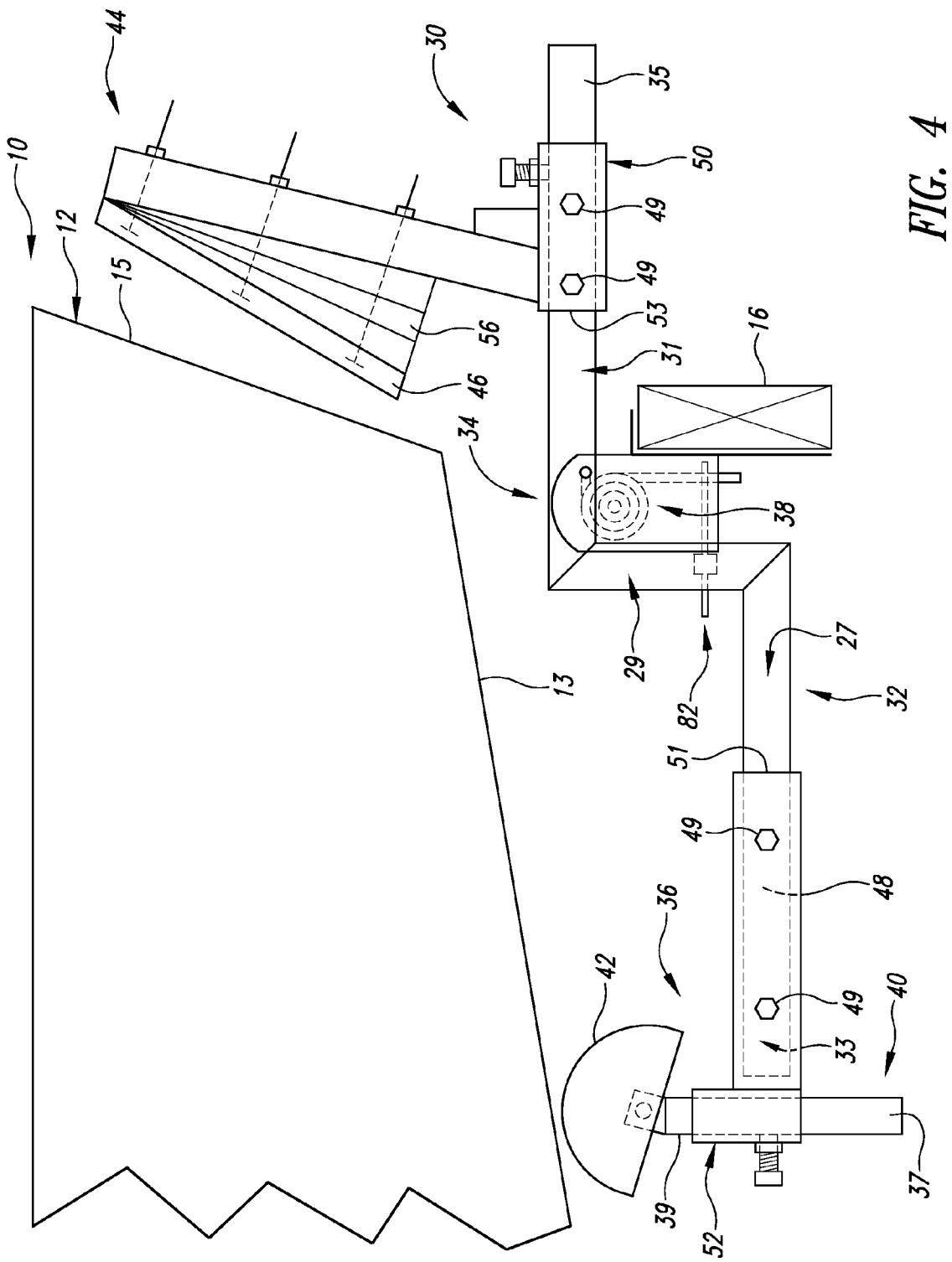
FIG. 4 is a side view of a boat centering device formed in accordance with one embodiment of the present disclosure.

In accordance with another embodiment of the present disclosure, FIG. 4 illustrates a side view of the boat centering device 30. The device 30 includes a lever arm 32 mounted on a mount 34 on the trailer 14. Ideally the lever arm 32 will rotate about an axis that is approximately parallel to the longitudinal axis of the trailer 14. However, it is to be understood that the lever arm 32 can rotate on an axis having a different orientation to achieve a different mechanical advantage or to accommodate boat and trailer designs. An outrigger 44 is mounted on the second end 35 of the lever arm 32, while the contact member 36 is mounted on the first end 33. In one embodiment, the lever arm 32 includes a mounting opening to receive a mounting assembly for mounting the lever arms independently to the trailer frame. Ideally, in the foregoing embodiment, the mounting assembly includes at least one axle (not shown) that attaches to the trailer and receives the mounting opening. In another embodiment, the lever arm 32 is formed to correspond to the shape of the trailer frame 16. Here, the lever arm 32 comprises three bars 27, 29, and 31 joined together to be positioned around the trailer frame 16 without contacting the trailer frame 16. The lever arm 32 pivots on the mount 34, as shown in FIG. 4. Ideally, the lever arm 32 is formed of steel, although it is understood that other material may be used, such as plastic or aluminum. The material is treated to withstand corrosion from either or both salt water and fresh water.

In yet another embodiment, the lever arm 32 includes an adjustment bar 48 that adjusts the location of the contact member 36 and an adjustment bar 50 that adjusts the location of the outrigger 44. The adjustment bars 48 and 50 are slideably engaged over the respective first and second ends 33, 35 of the lever arm 32 and retained in place by suitable fasteners 49 to allow the device 30 to accommodate boats of various shapes and sizes.

In FIG. 4, the outrigger 44 is adapted to urge the boat 10 towards the center of the trailer 14 when the boat 10 is in contact with the contact member 36. The outrigger 44 is also adapted to maintain a distance of separation from the boat hull 12 when the boat 10 is centered on the trailer 14 and resting on the bunks 18, as shown in FIG. 3B. The distance of separation is important because it ensures that the hull 12 is not damaged in transport, by the outriggers 44.

Figure 5:
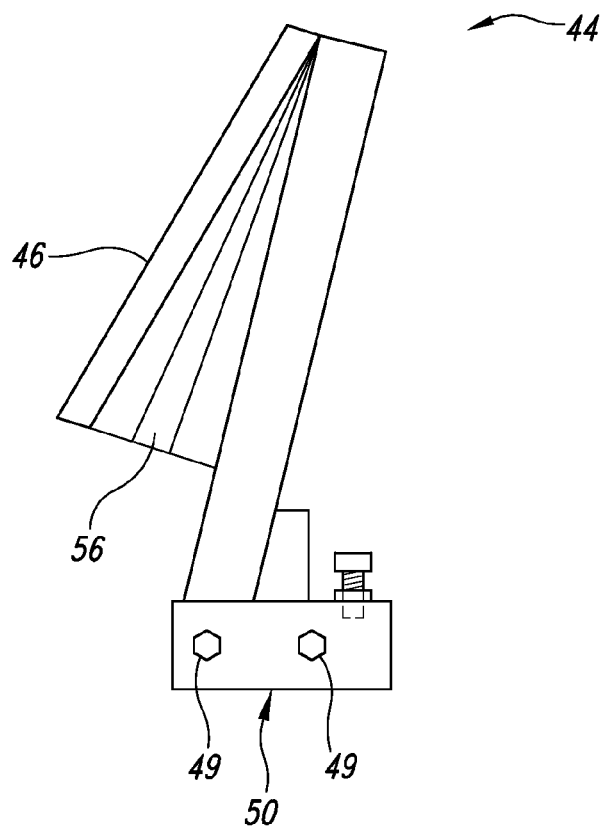
FIG. 5 is a side view of an outrigger formed in accordance with one embodiment of the present disclosure.

As shown in FIG. 4 and again in FIG. 5, the outrigger 44 includes a bumper 46 preferably formed of plastic, although other materials can be used. In one embodiment, the outrigger 44 includes adjustable wedges 56 that are configured to have adjustable dimensions, such as by expansion and contraction, to accommodate boat hulls of various shapes and sizes.

Figure 6:
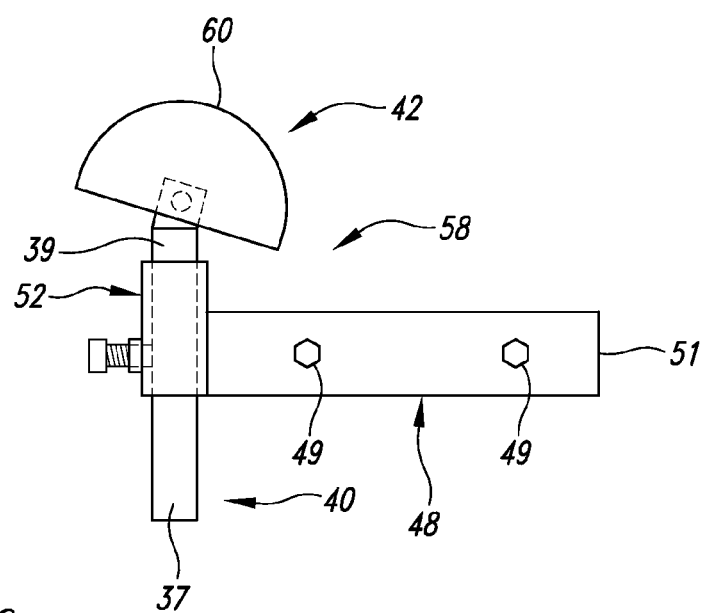
FIG. 6 is a side view of a contact member attached to a lever arm.

In FIG. 4, contact members 36 preferably include a support post 40 that attaches to the lever arm 32 at one end 37 and have a bumper 42 attached at the other end 39, as shown in FIGS. 4 and 6. The bumper 42 is preferably formed of polyethylene and has a rectangular base 58 with a curved head 60. As shown in FIG. 6, the bumper 42 is preferably mounted to have a fixed angle laterally with respect to the longitudinal axis of the support post 40. The preferred shape and position of the bumper 42 allows the device 30 to accommodate the chine of the boat 10 without causing damage to the boat hull 12 during movement of the hull 12 or by constraining movement of the boat 10 on the trailer 14. However, other methods of support can be used for the contact member 36, such as a nonadjustable post without a bumper or a support post with a bumper of a different shape, for example, one that includes a square or triangular head. In one embodiment, the support post 40 also includes an adjustment bar 52 that varies the length of the support post 40 in order for the device 30 to adapt to different sizes and shapes of trailers and boat hulls.

Figure 7:
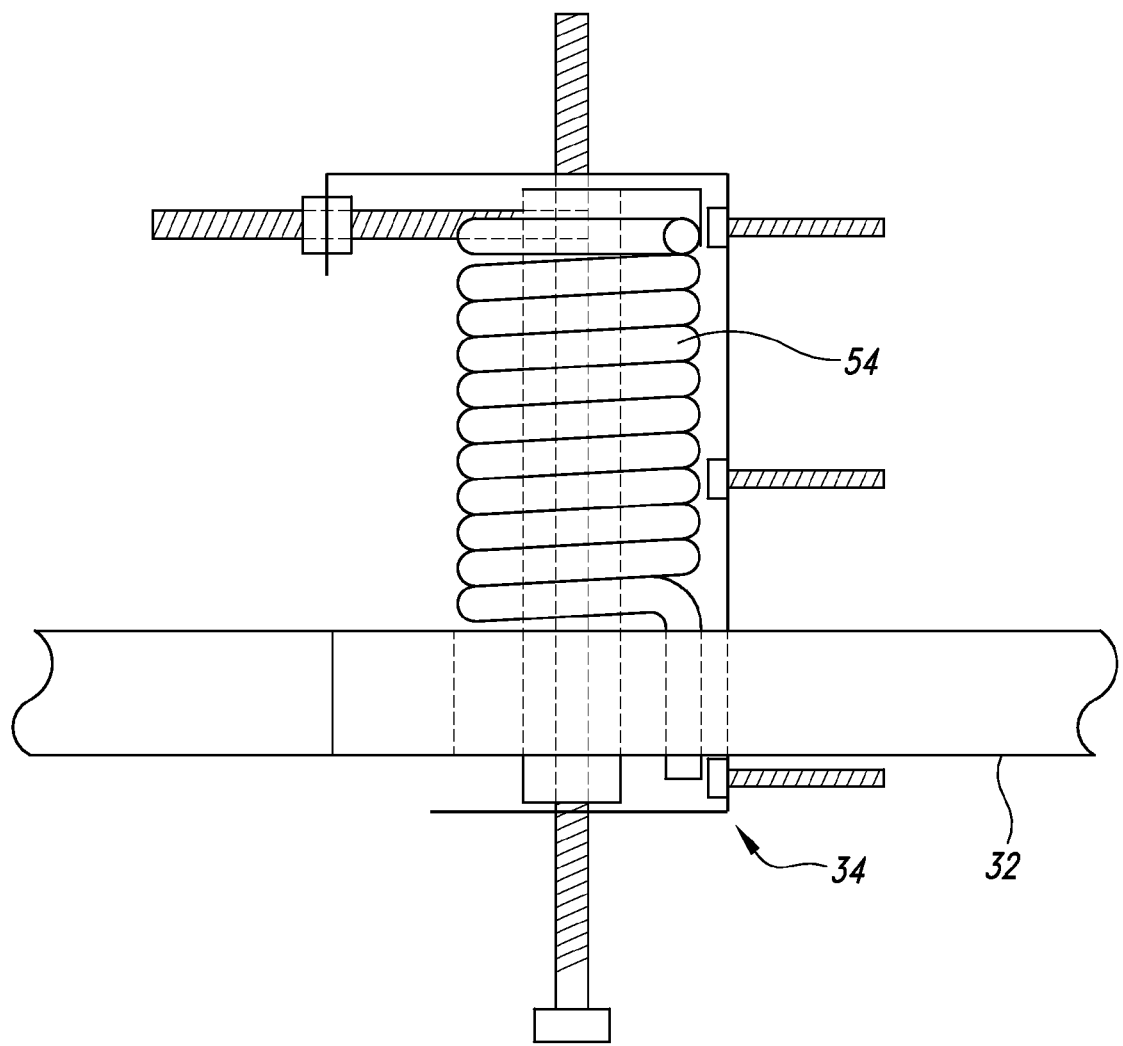
FIG. 7 is a top view of a lever arm and corresponding mounting assembly according to one embodiment of the present disclosure.

As further shown in FIG. 4, in one embodiment, the biasing member 38 is also associated with the device 30. The biasing member 38 rotates the lever arm 32 in a direction that will move the contact member 36 upward when the boat hull 12 is not in contact with the contact member 36. For example, the contact member 36 will move upward when the device 30 is not in use or when the boat 10 is floating above the device 30 and has not yet come to rest on the trailer 14. It is preferred that the biasing member 38 include a torsion spring 54, as shown in FIG. 7. However, it is understood that other methods for biasing may be used that are known to those skilled in the art. In one embodiment, the biasing member 38 is housed within the mount 34 while the mount 34 is attached to the lever arm 32 and the trailer frame 16, as shown in FIG. 4.

In order for the lever arm 32 to achieve the greatest mechanical advantage, it is preferred that the length between the mount 34 and the contact member 36 on the first end 33 be greater than the length between the mount 34 and the outrigger 44 on the second end 35. To this end, it is preferred to construct the lever arm 32 such that the distance between the mount 34 and the proximal end 51 of the adjustment bar 48 is greater than the distance between the mount 34 and the proximal end 53 of the adjustment bar 50. The adjustment bars 48 and 50 can further be used to adjust the ratio of the two lengths in order to achieve an even greater mechanical advantage when the shape and size of the boat 10 allow. However, it is understood that other alternative methods of determining the ratio can be used, such as using a lever arm that is completely adjustable in length.

Figure 8A:
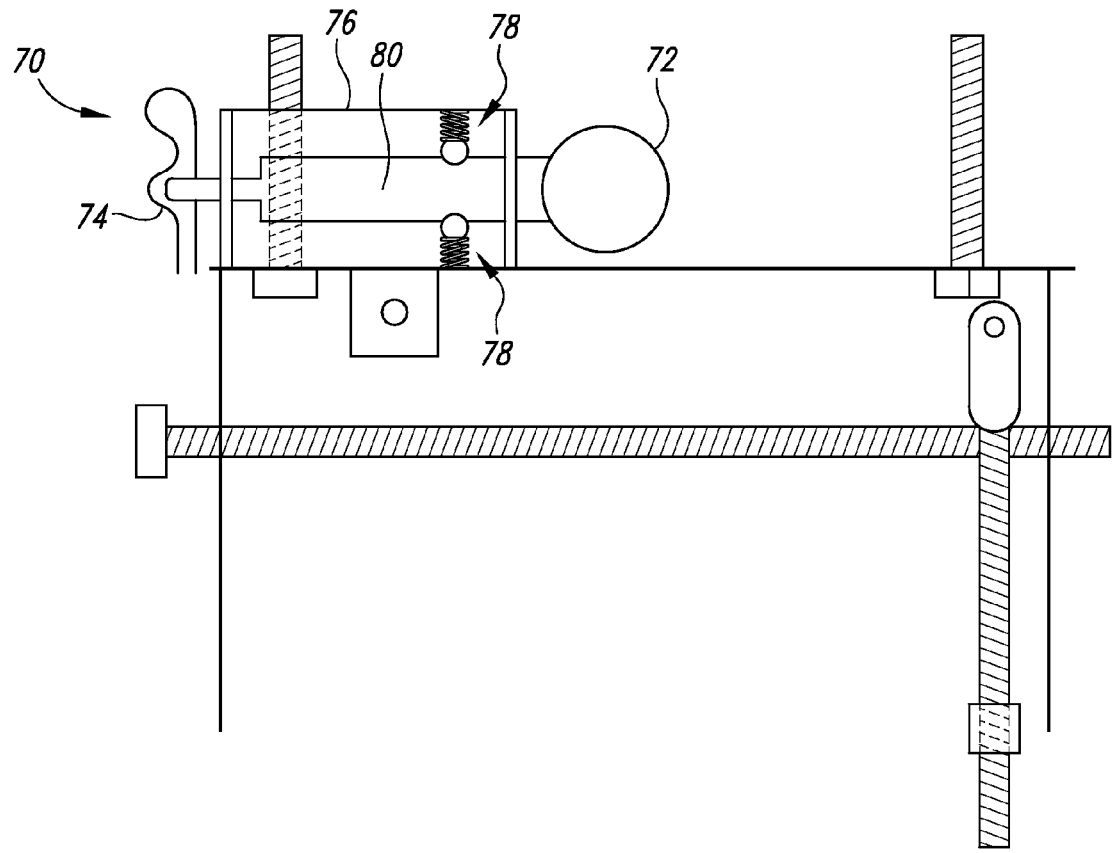
FIG. 8A is a top view of a safety device attached to a mount in accordance with one embodiment of the present disclosure.
Figure 8B:
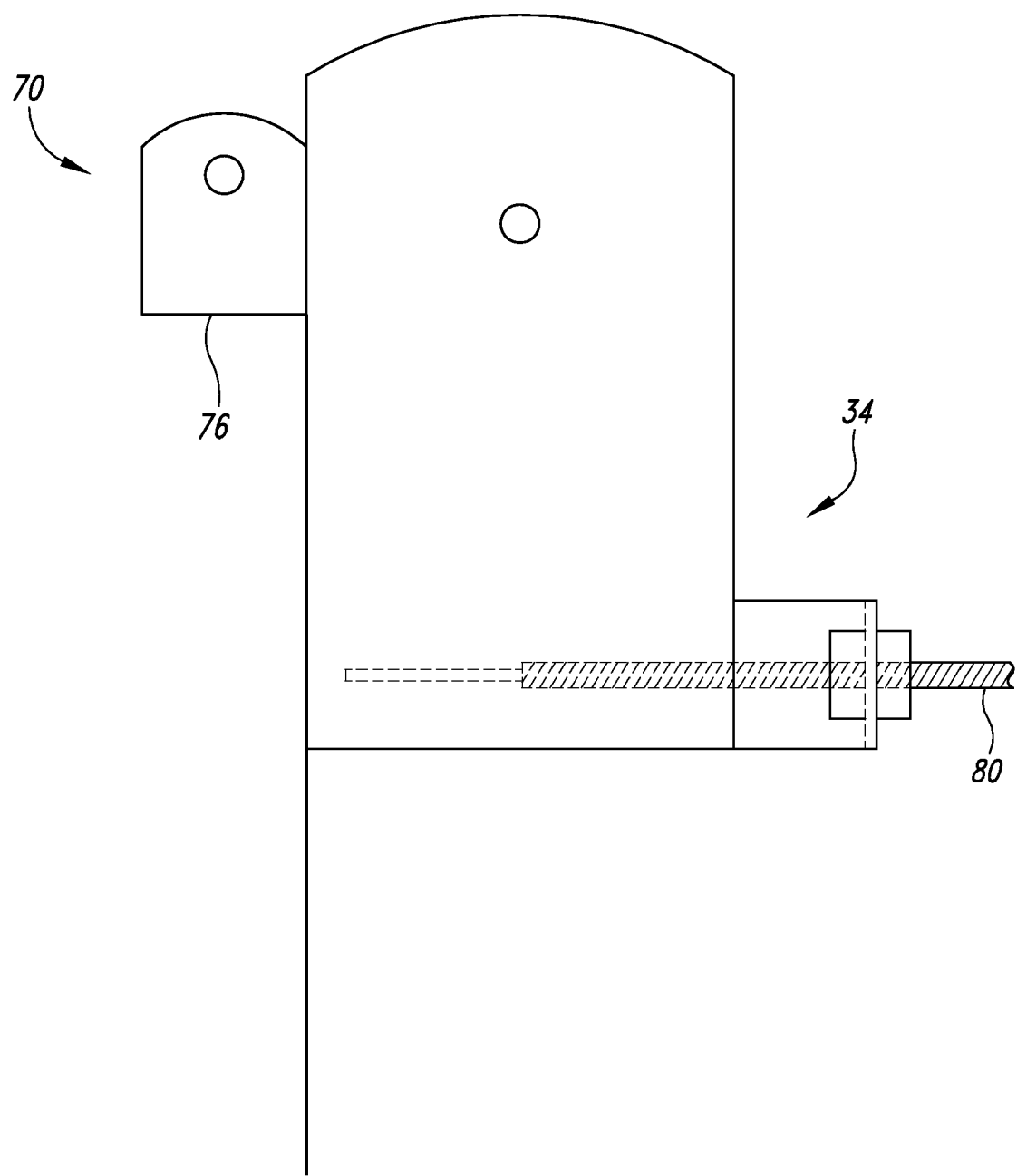
FIG. 8B is a side view of the safety device attached to a mount in accordance with one embodiment of the present disclosure.

FIG. 8A illustrates a safety device in accordance with another embodiment of the present disclosure. The safety device 70 includes a detent pin 80 having a double failsafe key ring 72 and pin 74. The detent pin 80 is used to secure the lever arm 32, and thus the outrigger 44, in a position where the lever arm 32 and the outrigger 44 are rotated towards the center of the trailer 14. In the embodiment where the biasing member 38 rotates the lever arm 32 in such a direction as to cause the outrigger 44 to move away from the center of the trailer 14 and over the edge of the trailer frame 16, the safety device 70 is used to store the outrigger 44 in a position that will cause the outrigger 44 to remain within the boundary of the trailer frame 16, and thus prevent damage to the outrigger 44 and to objects that the outrigger 44 may hit. In one embodiment, a detent ball 78 is used to secure the position of the detent pin 80. In yet another embodiment, the safety device 70 is encased in a housing 76 and attached to the mount 34, as shown in FIG. 8B.

In construction, the various components of the device 30 are preferably attached together using either conventional bolts, tension bolts, or welded together to form a rigid structure. However, it is to be understood that other methods of attachment may be used, including fasteners, tightly-fitted joints, and other methods known to those skilled in the art.

Figure 9D:
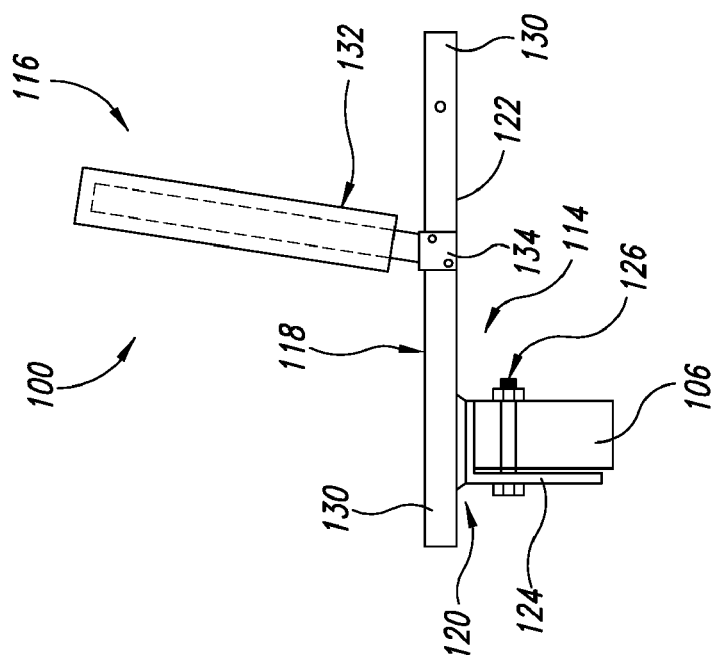
FIGS. 9D and 9E are rear and side views, respectively, of the device of FIG. 9B mounted on a boat frame member.
Figure 9E:
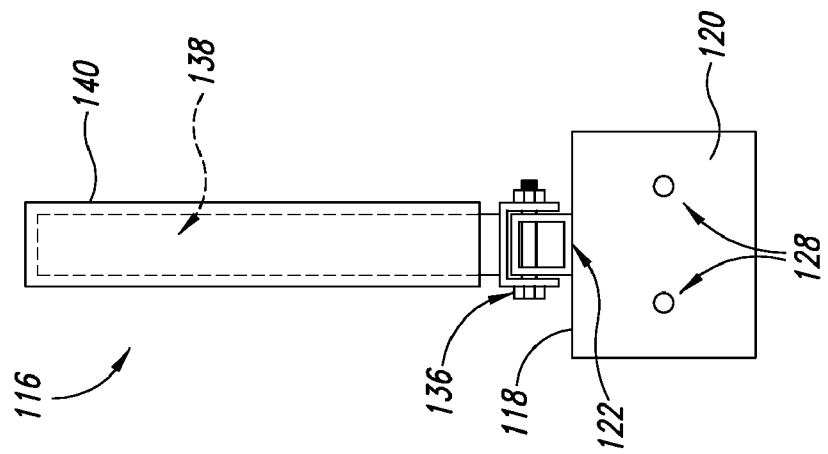
Figure 9F:
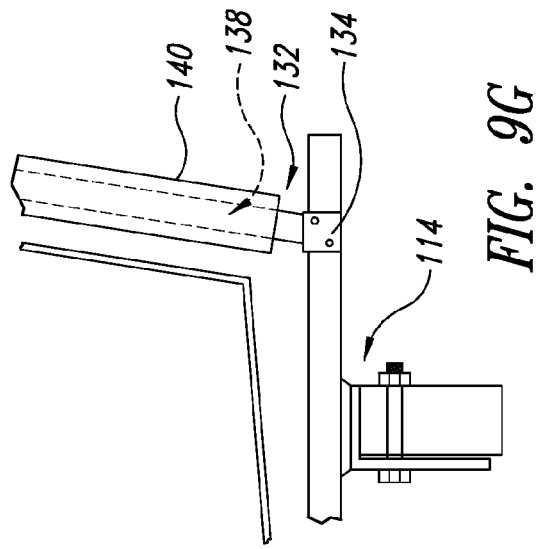
FIGS. 9F and 9H are rear and top views, respectively, of the device in the engaged position.
Figure 9G:
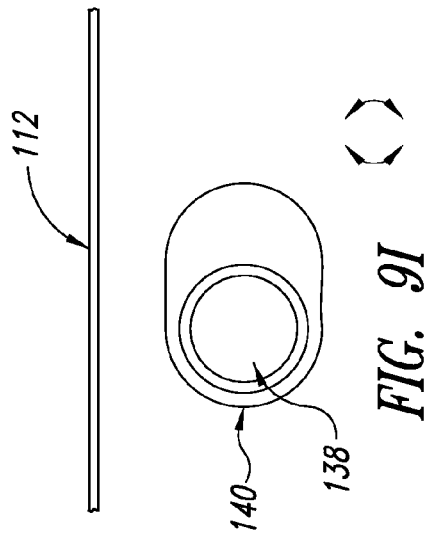
FIGS. 9G and 9I are rear and top views, respectively, of the device in the disengaged position.
Figure 9H:
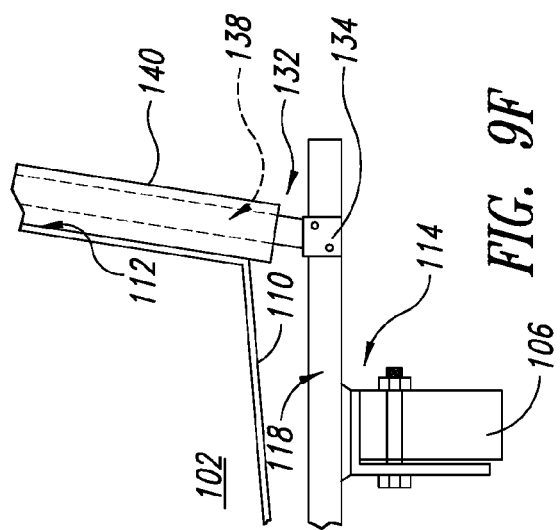
Figure 9I:
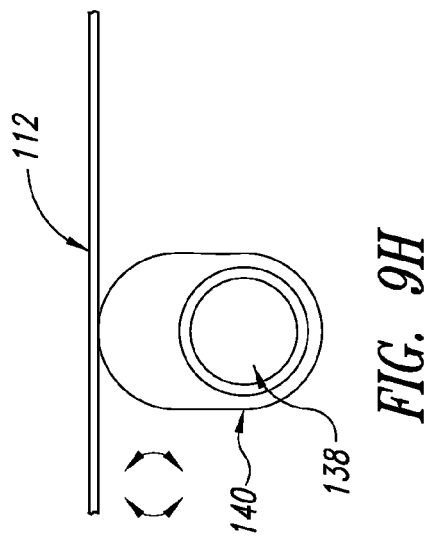
Figure 9J:
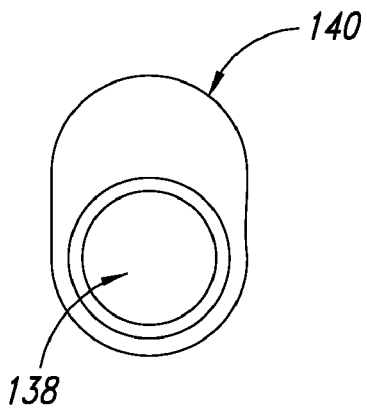
FIGS. 9J-9P are top cross-sectional views of various configurations of a bumper mechanism formed in accordance with the present disclosure.
Figure 9M:
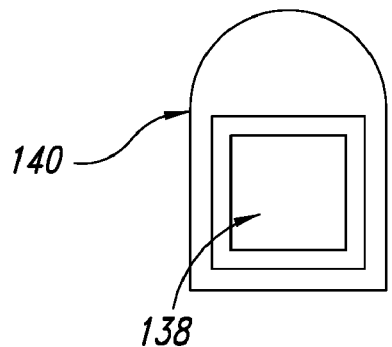
Figure 9K:
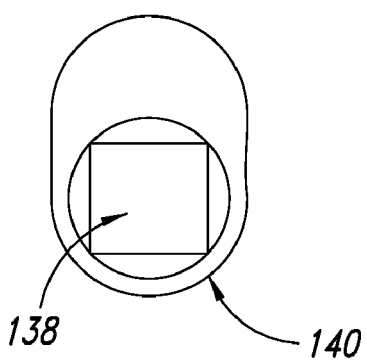
Figure 9N:
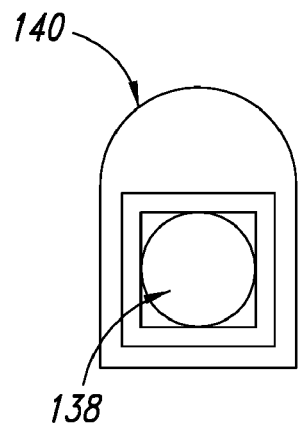
Figure 9L:
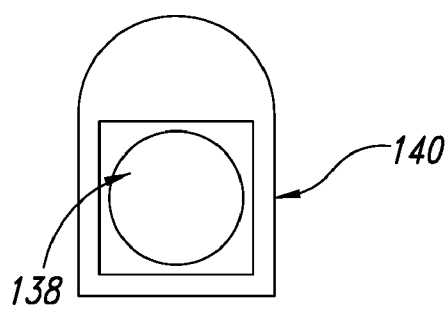
Figure 9O:
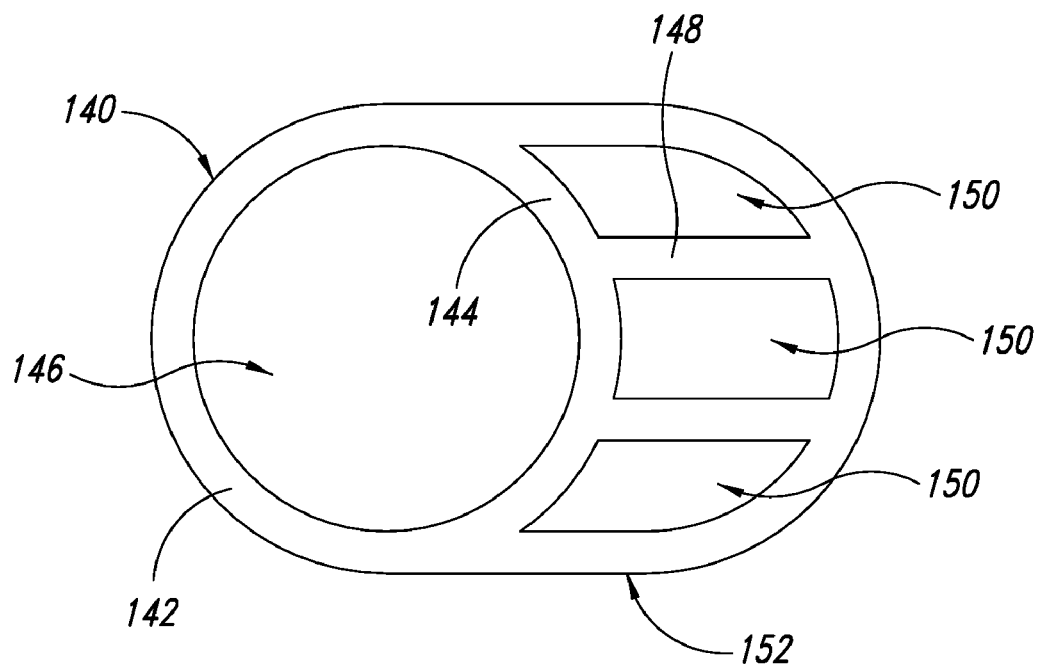
Figure 9P:
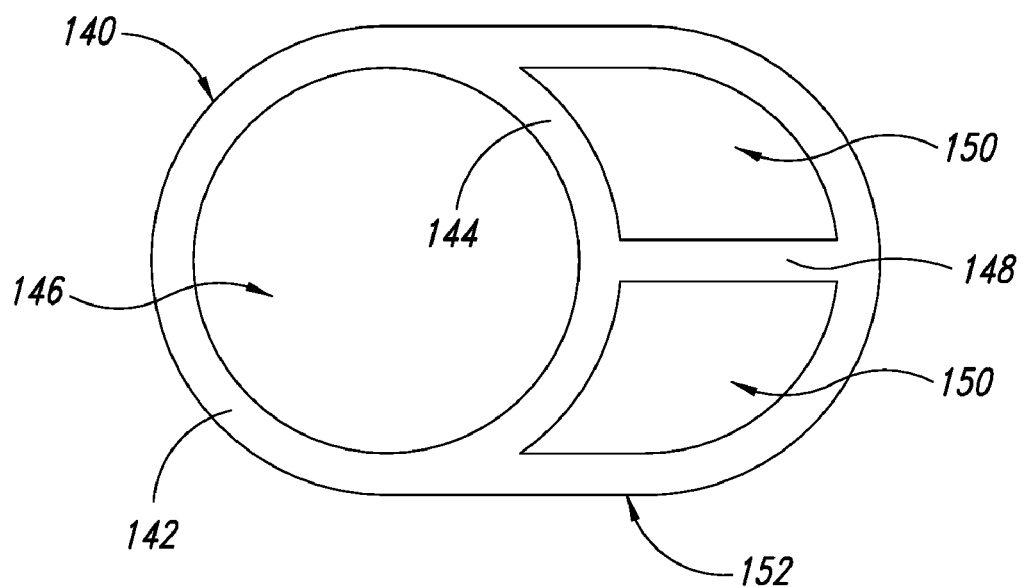
Figure 9Q:
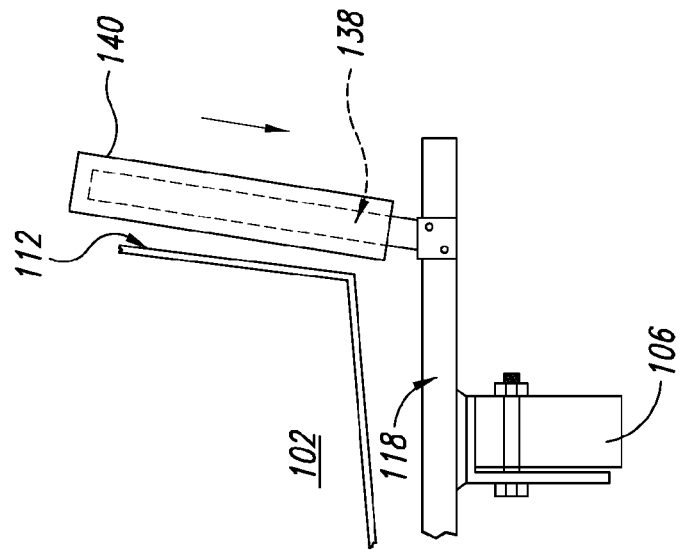
FIGS. 9Q-9S are rear views illustrating movement of the bumper mechanism with respect to the boat and the trailer between the engaged and disengaged positions.
Figure 9R:
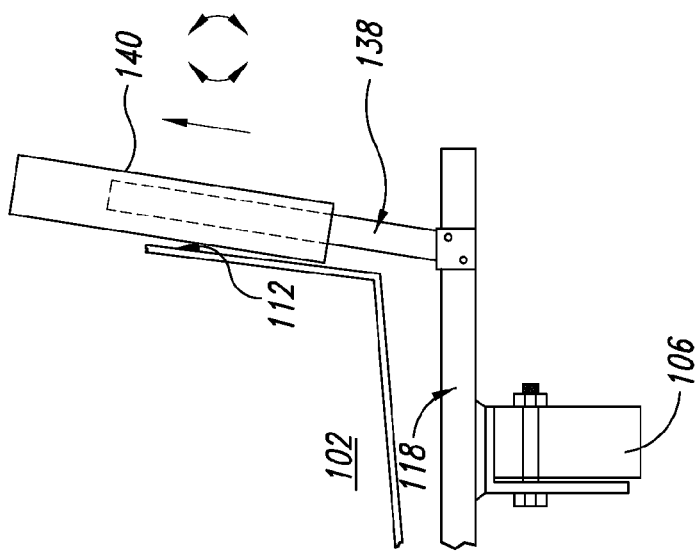
Figure 9S:
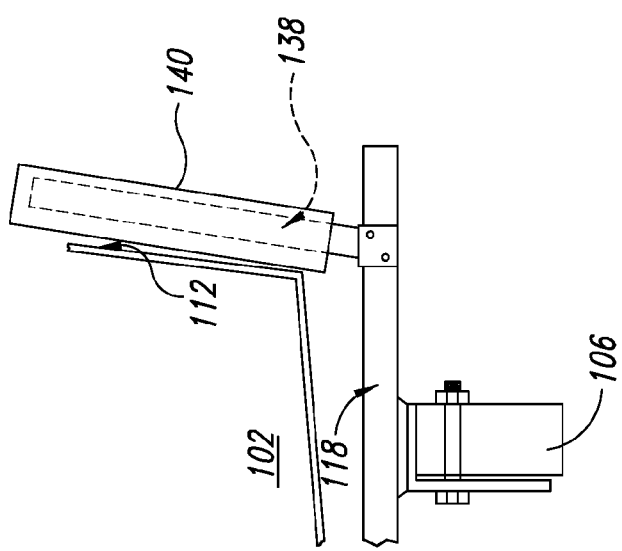
Figure 9Z:
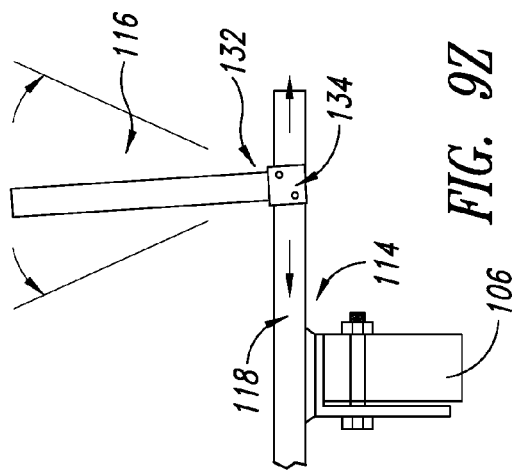
FIGS. 9X-9Z are rear, side, and rear views, respectively, of an alternative embodiment showing adjustment in the position of the vertical portion of the bumper mechanism relative to the horizontal portion, the trailer, and in FIG. 9X the boat.

For example, FIGS. 9A-9Z illustrate yet another embodiment of the present disclosure in which a device 100 for guiding a boat 102 onto a trailer 104 is illustrated. More particularly, referring initially to FIGS. 9A-9C, shown therein in general from without specific details is the device 100 coupled to the trailer 104 for guiding a boat 102 onto the trailer 104. Side rails 106 support the trailer wheels 108. The boat hull 110 has sides 112 that contact the device 100 to center the boat hull 110 laterally with respect to the side rails 106 so that the boat 102 is centered laterally on the trailer 104 when loading the boat 102 on the trailer 104 from the water.

Referring next to FIGS. 9D and 9E, the device 100 includes a mounting assembly 114 for mounting the device 100 to the side rail 106 and a bumper assembly 116 attached to the mounting assembly 114. In this embodiment, the boat frame member or side rail 106 constitutes a longitudinal rail having a substantially rectangular cross-sectional shape, which may be hollow or solid and formed of metal, wood, composite plastics, or the like. The device 100 of the present disclosure is adapted to be an add-on device for existing trailers or can be manufactured as an integral component of new trailers.

As shown in this embodiment, the mounting assembly 114 includes a horizontally positioned tube mounted on the side frame 106 via an L-shaped mounting plate 120. As shown in FIGS. 9D-9E, the horizontal tube 118 is a four-sided tube having a square cross-sectional configuration with a hollow interior. The L-shaped mounting bracket 120 is attached to a bottom surface 122 of the horizontal tube 118, such as by welding, adhesion, or with fasteners. Alternatively, the mounting bracket 120 can be integrally formed with the tube 118. A wall member 124 extends down away from the tube 118 at substantially a 90° angle in this embodiment so as to be positioned adjacent the side rail 106 when mounted thereto by a suitable fastener 126. Appropriately dimensioned through holes 128 can be formed in the wall member 124 to accommodate the fasteners 126. It may be necessary in retrofit applications to drill a hole through the side rail 106 to accommodate the fastener 126. Ideally, no less than two fasteners are used to provide secure fastening and redundancy in case one fastener fails.

When so mounted to the side rail 106, the horizontal tube 118 is positioned substantially horizontally. It is not required that the tube be at a 90° angle to the side rail 106 or perfectly level with the horizon. However, the tube 118 should be dimensioned such that a first end 130 does not contact the boat hull 110 when the boat 102 is resting on or being positioned on the trailer 104. Moreover, the length of the horizontal tube 118 should extend a sufficient distance to the second end 130 to allow positioning of the bumper assembly 116 an appropriate distance from the side 112 of the boat 102.

The bumper assembly 116 includes a bumper mechanism 132 mounted to or integrally formed with a U-shaped channel member 134 sized and shaped to be slideably mounted to the top and sides of the horizontal tube 118. At least one and preferably two through bolts 136 project through the channel 134 and the horizontal tube 118 to hold the bumper assembly 116 in position on the mounting assembly 114. The bumper mechanism 132 extends from the U-shaped channel 134 in substantially a vertical orientation and includes a support post 138 having a bumper in the form of a plastic sheath 140 rotatably mounted thereon.

Figure 9X:
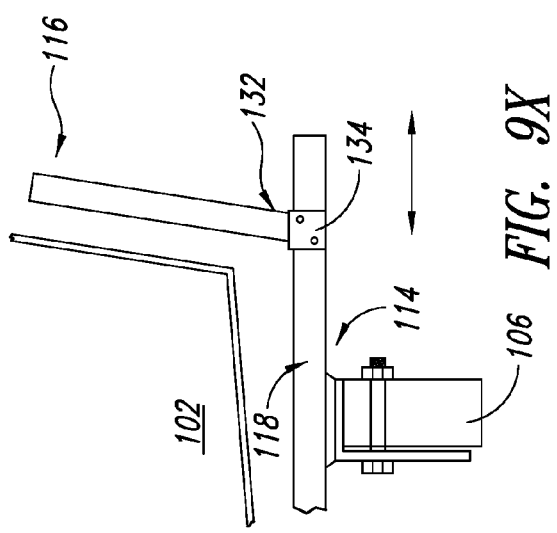
Figure 9Y:
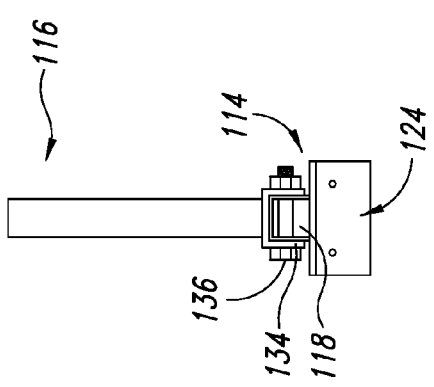

FIGS. 9X-9Z illustrate the process for orienting the bumper assembly 116 on the mounting assembly 114. More particularly, the bumper mechanism 134 is slideably mounted on the horizontal tube 118 via the U-shaped channel 134 that can slide horizontally along the tube 118. As shown in FIG. 9Z, the bumper mechanism 132 can rotate about a horizontal axis to change its vertical orientation. In other words, the U-shaped channel 134 can be tilted to the left or right as shown in FIG. 9Z to alter the relative angle of the support post 138 with respect to the tube 118. Mounting holes (not shown) are formed in the tube 118 that are sized and shaped to accommodate the fasteners 126 to hold the bumper assembly 116 at a selected orientation relative to the tube 118. This feature enables matching the position of the bumper assembly 116 to the angle of the boat side 112 to accommodate different boat profiles.

Turning next to FIGS. 9F-9I, shown therein is a first aspect of this embodiment in which the bumper or sheath 140 is rotatably mounted to the upright support post 138 to form the bumper mechanism 132. In FIGS. 9F and 9H, the sheath 140 is rotated relative to the support 138 to be in an engaged position. The engaged position is one in which the side 112 of the boat 102 is positioned very close to or in contact with the bumper sheath 140. This contact prevents the boat 102 from going any further toward the bumper assembly 116, holding it in an aligned position relative to the trailer or side rail 106. In FIGS. 9G and 9I, the bumper sheath 140 is rotated clockwise (as seen from the top view in FIG. 9H) to be out of contact with the boat side 112, which is denoted as the disengaged position.

FIGS. 9J-9N illustrate different cross-sectional configurations of the bumper sheath 140 and the support post 138. More particularly, the bumper sheath 140 is designed to rotate, twist, cam, or index between the engaged and disengaged positions, ideally by 90°, when mounted on the support post 138. In the embodiments shown in FIGS. 9K-9L, in order to rotate the bumper sheath 140 with respect to the upright support post or outrigger 138, it is necessary to completely lift and remove the bumper sheath 140 therefrom, then reorient the bumper sheath 140 by rotating it to the desired orientation, and then slide it back down onto the support post 138 into a locked position. In the embodiment shown in FIG. 9J, it is not necessary to lift the bumper sheath 140 off the support post 138 because the matching surfaces are both circular. In this case, the bumper sheath 140 rotates on the support post 138 and is held in position by detents, lock buttons or pins, bolts, or other known mechanisms for holding the two parts stationary relative to one another. In the embodiments shown in FIGS. 9M and 9N, only the lower portions of the support post 138 have the square cross-sectional shape so that the bumper sheath 140 only needs to be lifted a sufficient distance to clear the square-shaped portion of the support post 138 before it is rotated.

FIGS. 9O and 9P illustrate alternative cross-sectional internal construction of the bumper sheath 140. As shown in FIG. 9O, the bumper sheath 140 has an external wall 142 of a substantially oblong shape in which an arcuate internal wall 144 defines a circular hollow interior 146. Extending from the arcuate wall 144 are internal walls 148 defining hollow compartments 150 that absorb shock and permit limited deformation of the bumper region 152 of the bumper sheath 140. In the embodiment depicted in FIG. 9P, only one interior wall 148 is used, which provides less rigidity and less support and which would be suitable for lighter boats.

FIGS. 9Q-9S illustrate the steps of rotating the bumper sheath 140 for the embodiments depicted in FIGS. 9K and 9L. More particularly, in FIG. 9Q the bumper sheath 140 is in the engaged position relative to the boat 102 and the upright support 138. In FIG. 9R, the bumper sheath 140 is lifted off the support 138 and rotated to the disengaged position shown in FIG. 9S, where the bumper sheath 140 is then replaced back down onto the support post 138 in a locked or fixed configuration.

In FIGS. 9T-9W, the embodiment depicted in FIG. 9N is illustrated in which the support post 138 has a lower square portion 154 and an upper round portion 156 extending therefrom. The bumper sheath 140 has a matching interior construction with an internal square receptacle 155 so that the bumper sheath 140 only needs to be lifted sufficiently to clear the square portion 154, be turned to the disengaged position shown in FIG. 9W, after which the bumper sheath 140 is replaced back onto the square portion 154.

Although a square bottom portion 154 has been illustrated, it is to be understood that various geometric shapes may be used for the cross-sectional configuration to provide for rotation other than at 90° increments. For example, a six-sided configuration would provide for rotation in 60° increments.

FIGS. 10A-10C illustrate another embodiment of the present disclosure in which a bumper assembly 160 is shown attached to a cross member 107 extending from the side rail 106. More particularly, a hollow tube 162 is attached to the cross member 107 by suitable fasteners 164. A support post having an L-shaped configuration is provided with a first leg 166 inserted within the hollow tube 162 and an upright support leg 168 extending upward adjacent the side 112 of the boat 102. A bumper 170 is attached to an upper portion of the support leg 168 to contact the boat side 112. The first leg 166 slides transverse to the side rail 106 to move the bumper 170 between an engaged and disengaged position as shown in phantom in FIG. 10A. The first leg 166 is held stationary with respect to the tube 162 via a lock pin 172 inserted through appropriately sized and shaped openings 174 in the tube 162 and the first leg 166 as shown in FIG. 10C.

Figure 10D:
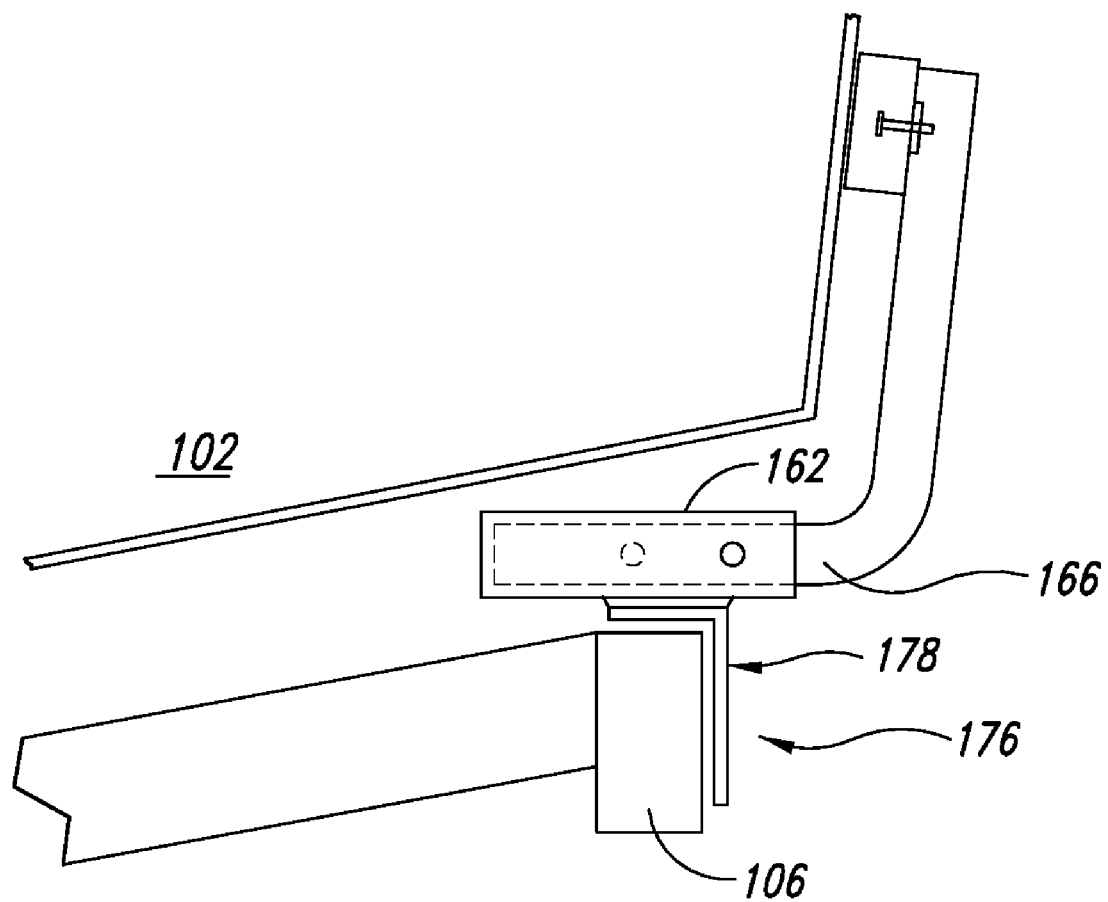

FIG. 10D shows an alternative mounting assembly 176 that is attached to the side rail 106 by an angle bracket 178 in a manner described above with respect to FIGS. 9D-9E. In this embodiment, the attachment to the side rail 106 allows a shortening of the leg 166, providing less chance of interference or contact with the boat 102.

Figure 11A:
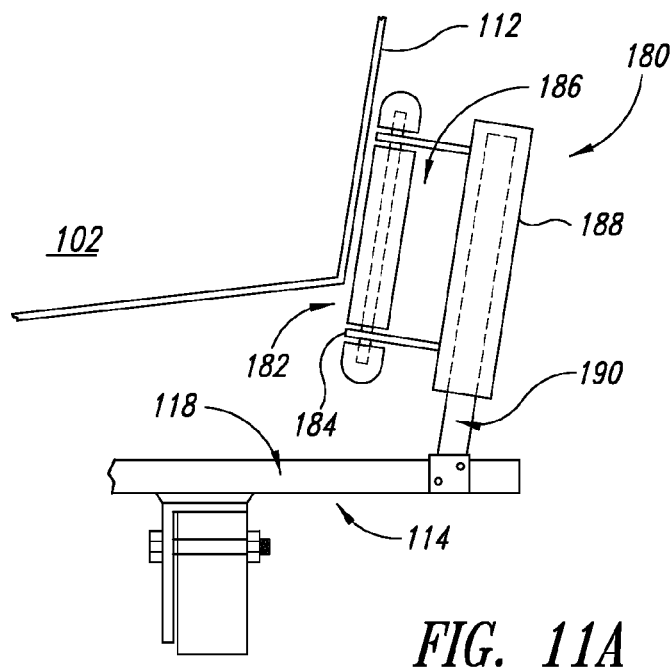
FIGS. 11A-11C are side, top, and top views, respectively, of another alternative embodiment of a bumper mechanism relative to the boat and the trailer, respectively.
Figure 11B:
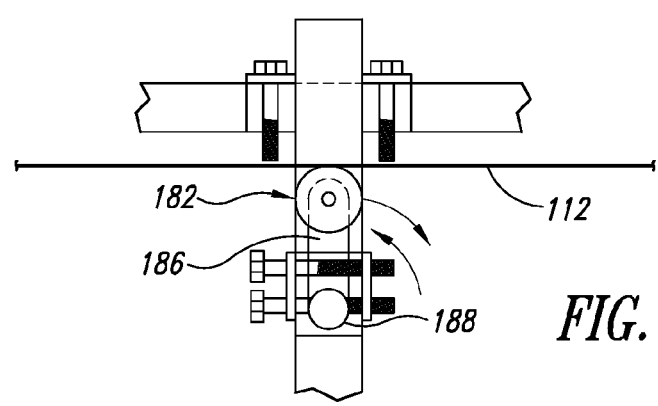
Figure 11C:
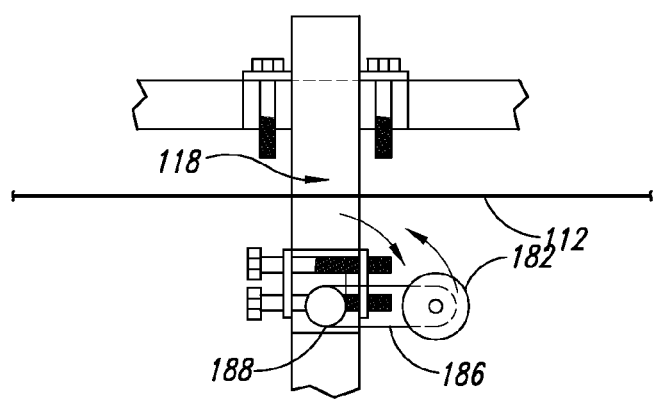

Turning next to FIGS. 11A-11C, shown therein is another embodiment in which the mounting assembly 114 has a different bumper assembly 180 attached thereto. Here, the bumper mechanism 180 includes a roller 182 formed of shock absorbing material or padded material to contact the side 112 of the boat 102. The roller is mounted on a roller pin 184 that is rotatably mounted to a roller bracket 186 that in this aspect of the disclosure is a single bracket. However, the bracket 186 may be formed of upper and lower brackets in a known manner. The bracket 186 is fixedly attached to a rotatable support 188 that is rotatably mounted on a lower support 190 as shown in FIG. 11A. In this embodiment, the roller 182 is shown in the engaged position adjacent the side 112 of the boat 102. This is also shown in the top view of FIG. 11B. In FIG. 11C, the roller 182 and bracket 186 are rotated by the rotatable support 188 to the disengaged position wherein the roller is positioned away from the side 112 of the boat 102. Holding of the rotatable support in the engaged or disengaged position can be done with a spring-loaded ball, detent, or latch, or with a fastener, catch, or other known device or method.

This embodiment utilizes an engaged position to achieve a true centering of the boat 102 that accommodates longitudinal movement of the boat on the trailer with the rollers. After loading is complete and the boat and trailer are out of the water, the upright rotatable segment 188 is unlocked from its engaged position and then rotated, cammed, twisted, or indexed to a disengaged position. It is then relocked in this position to ensure there is no rubbing or wear damage against the side 112 of the boat 102 during road travel.

Figure 12A:
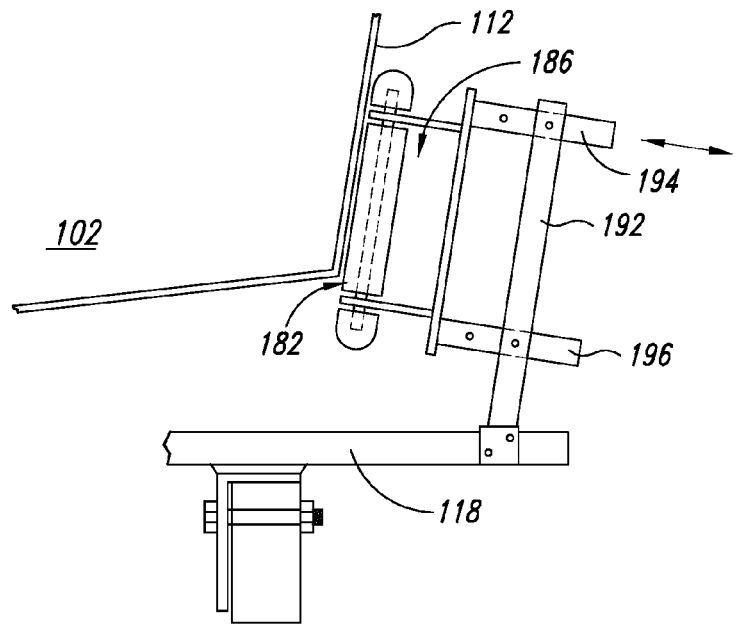
FIGS. 12A-12C are rear, rear, and side views, respectively, of an alternative embodiment of a bumper mechanism in accordance with the present disclosure.
Figure 12B:
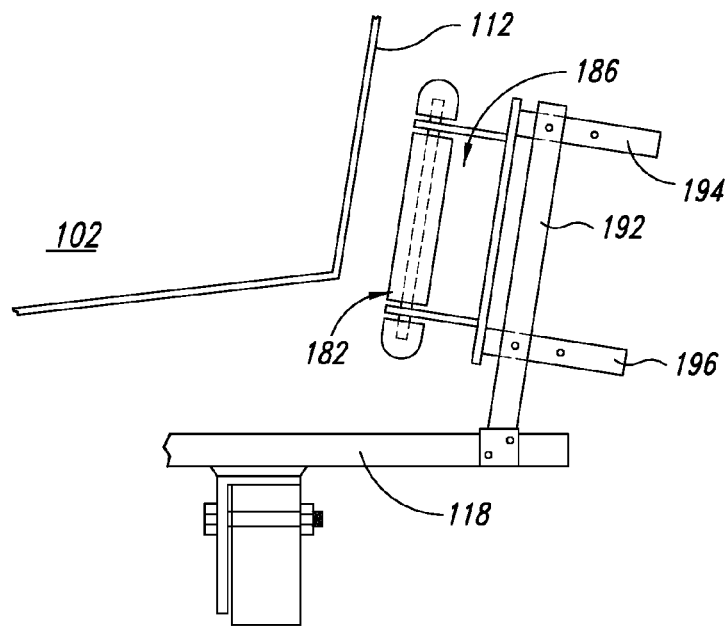
Figure 12C:
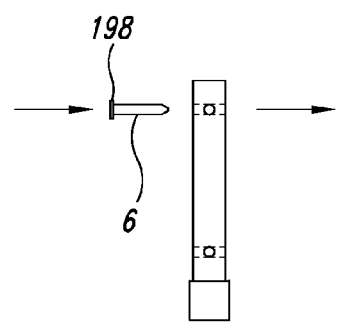

FIGS. 12A-12C illustrate an alternative of the foregoing embodiment in which the roller bracket 186 is mounted to an upright bracket 192 that slideably receives two horizontal bars 194, 196 to laterally move the roller 182 between the engaged and disengaged positions. A locking pin 198 shown in FIG. 12C is used to lock the horizontal bars 194, 196 in position on the upright 192.

Figure 13A:
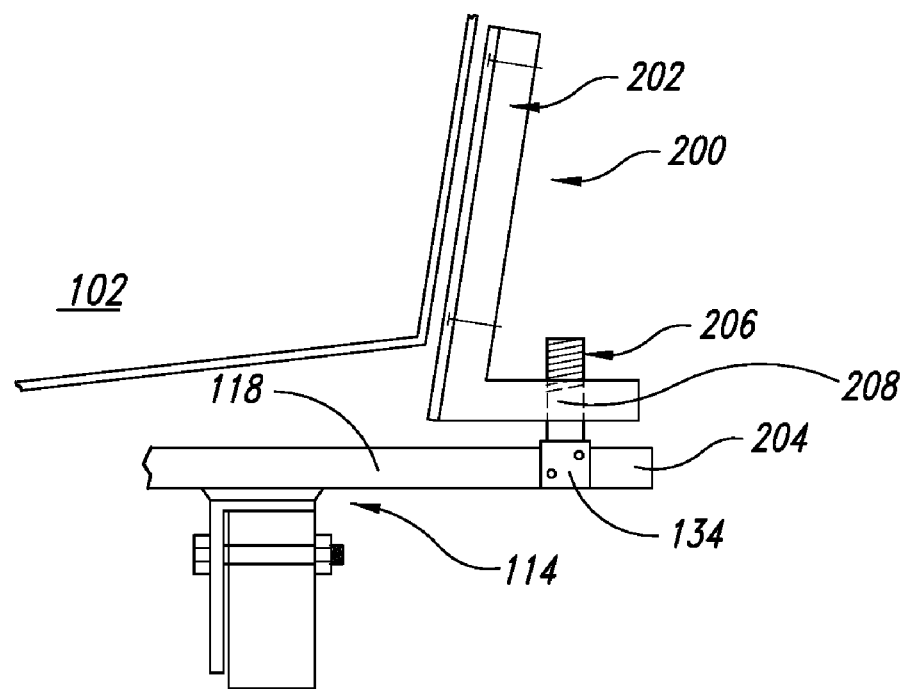
FIGS. 13A-13B are rear and top views, respectively, of another alternative embodiment of the present disclosure relative to the boat and the frame.
Figure 13B:
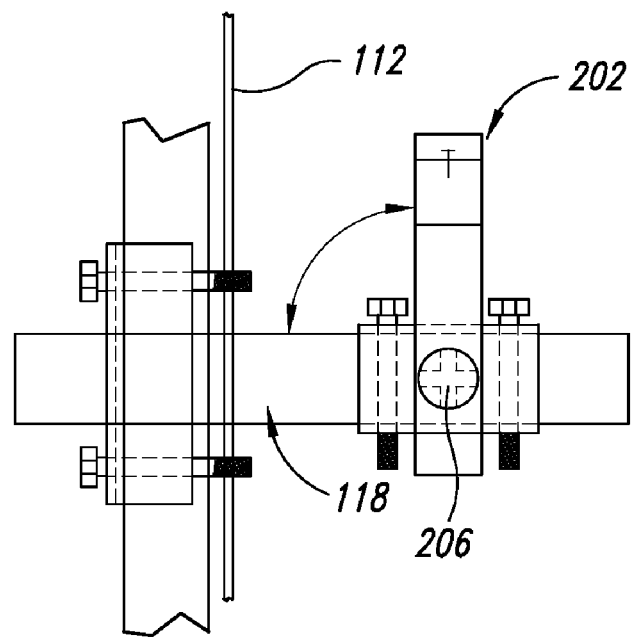

FIGS. 13A and 13B illustrate another embodiment of the present disclosure in which a bumper mechanism 200 is formed of a substantially L-shaped upright bumper 202 having a horizontal leg 204 rotatably mounted to a spindle 206 projecting from the U-shaped channel 134. A fastener projecting into through-holes 208 in the lower leg 204 index with corresponding holes in the spindle 206 will hold the bumper mechanism 200 in the engaged and disengaged positions shown respectively in FIGS. 13A and 13B.

Figure 14A:
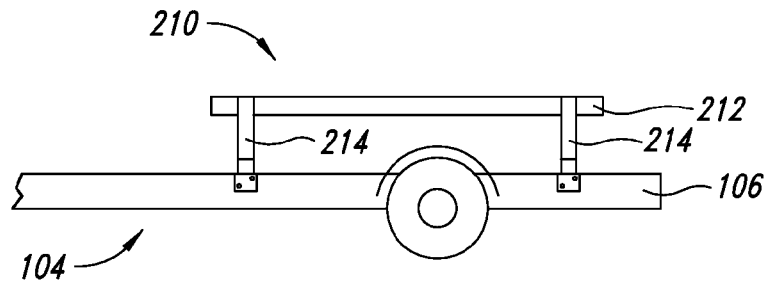
FIGS. 14A-14E are side, rear, rear, top, and top views, respectively, of a further alternative embodiment of the bumper mechanism formed in accordance with the present disclosure.
Figure 14B:
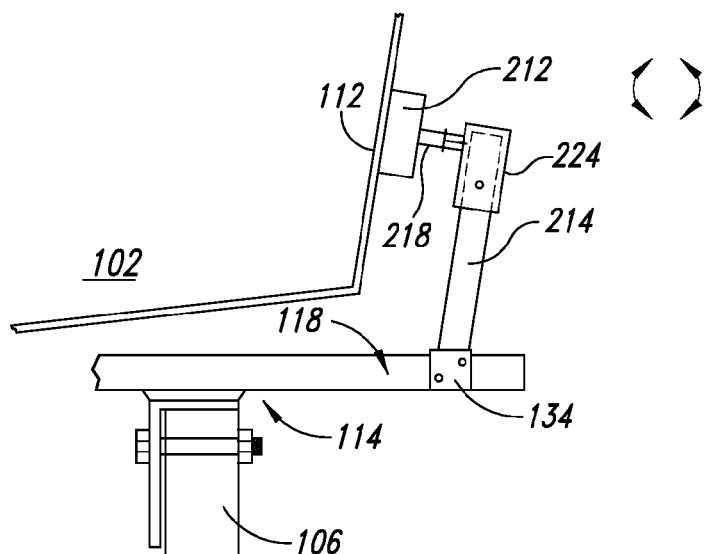
Figure 14C:
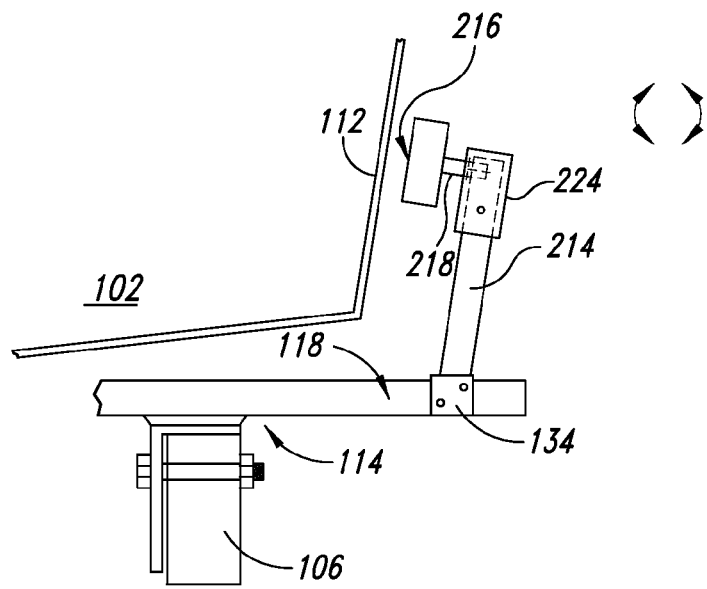
Figure 14D:
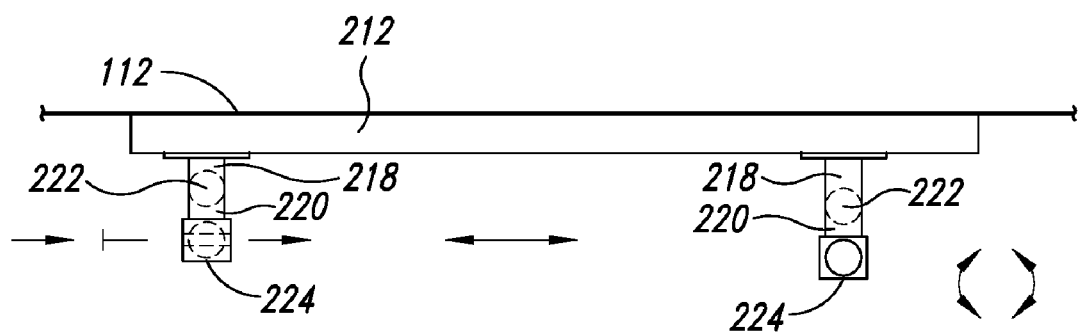
Figure 14E:
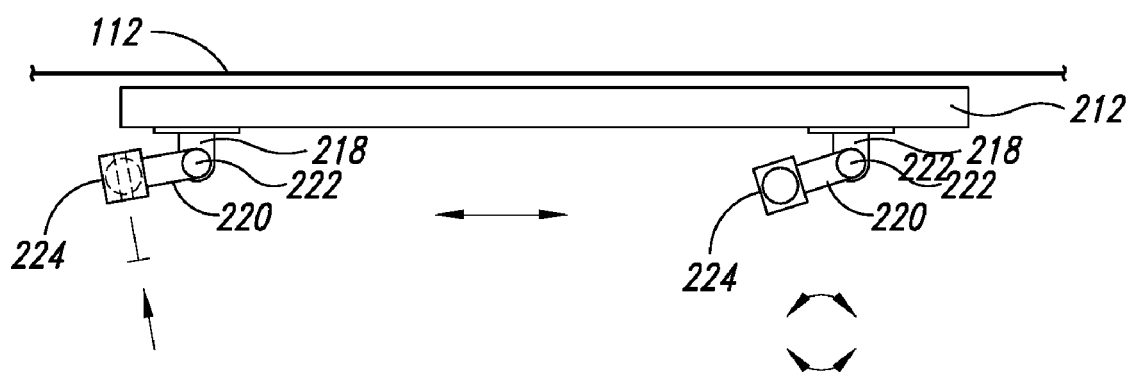

FIGS. 14A-14E illustrate yet another design of a bumper mechanism 210 having a horizontal rail 212 mounted to two upright supports 214 that are individually attached to the side rail 106 on each side of the trailer 104. The mounting assembly 114 is attached to the side rail 106 as previously described. Each upright support 214 has a lower end attached to the U-shaped channel 134. Each rail 212 comprises an elongate member that, in the depicted embodiment, has a substantially rectangular cross-sectional shape. It is to be understood that the rail can have other cross-sectional shapes. Ideally, the rail 212 has a contact surface 216 adapted to contact the side 112 of the boat 102 without damaging the boat hull or side 112. A first bracket 218 is attached to the side of the rail 212 opposite the bumper face 216 to extend horizontally outward therefrom. This first bracket 218 is pivotally attached to a second bracket 220 by a pivot pin 222. The second bracket 220 is fixedly attached to a rotatable tube 224 that rotates about the top end of the upright support 214. FIG. 14D is a top view showing the rail 212 in the engaged position adjacent the boat side 112. When the rail 212 is translated longitudinally to the right as viewed in FIG. 14D, the first and second brackets 218, 220 cooperate with the rotatable tube 224 to laterally move the rail 212 away from the boat side 112 as it translates longitudinally to the right as shown in FIG. 14E in the disengaged position.

While only one bumper mechanism 210 in this configuration is shown in FIGS. 14A-14E, it is to be understood that in a preferred embodiment a companion bumper mechanism 210 is mounted on the opposing side rail of the trailer 104. Thus, each bumper mechanism 210 cooperates to center the boat 102 on the trailer 104 during loading operations. After the boat 102 is centered and resting on the trailer 102 and removed from the water, the bumper mechanism 210 is moved from the engaged position of FIG. 14D to the disengaged position of FIG. 14E. Corresponding rear views of the engaged and disengaged positions are shown in FIGS. 14B and 14C, respectively.

FIGS. 15A-15E illustrate another bumper mechanism 226 mounted to an upright post 228 having its lower end attached to or formed with the U-shaped channel 134 that is slideably mounted on the horizontal tube 118. In this embodiment, a bumper head 230 is pivotally attached to a bracket 232. More particularly, a first end 234 of the bumper head 230 has an opening 236 to receive a pivot pin 238 received in the bracket 232 about which the bumper head 230 pivots to move a second end 240 between an engaged position shown in FIGS. 15A and 15B and a disengaged position shown in FIG. 15C. A rotatable adjustment screw 242 attached to the bracket 232 and threadably engaged or otherwise attached to the bumper head 230 controls movement of the bumper head 230 between the engaged and disengaged positions.

Figure 15A:
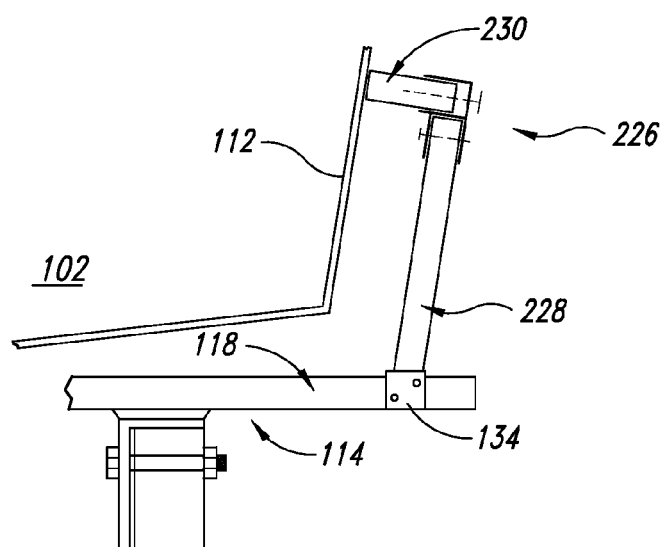
FIGS. 15A-15E are rear, top, top, enlarged rear, and sectional views, respectively, of still yet another alternative embodiment of the bumper mechanism formed in accordance with the present disclosure.
Figure 15C:
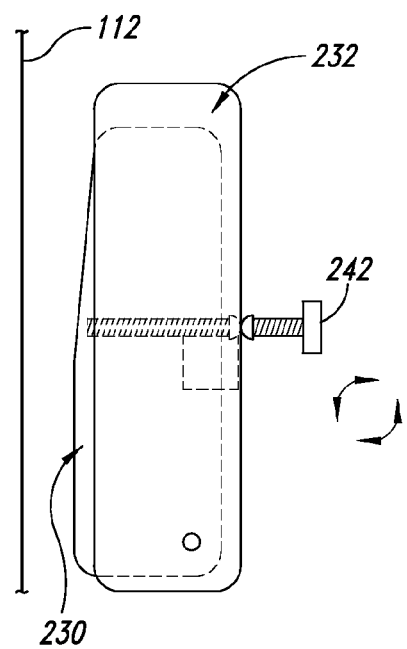
Figure 15B:
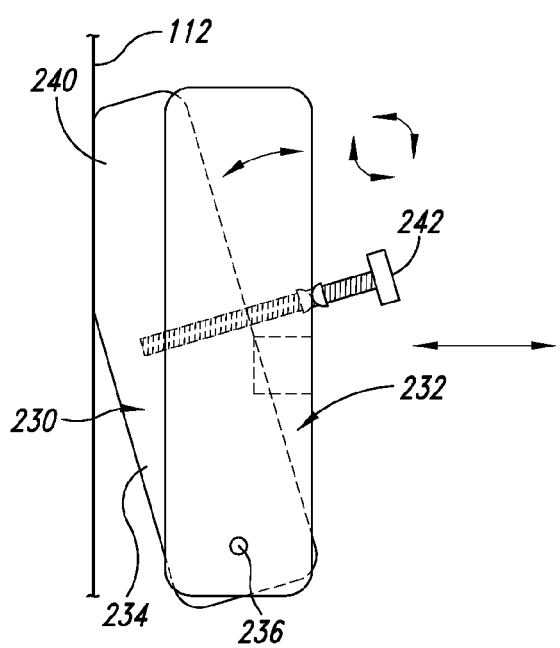
Figure 15D:
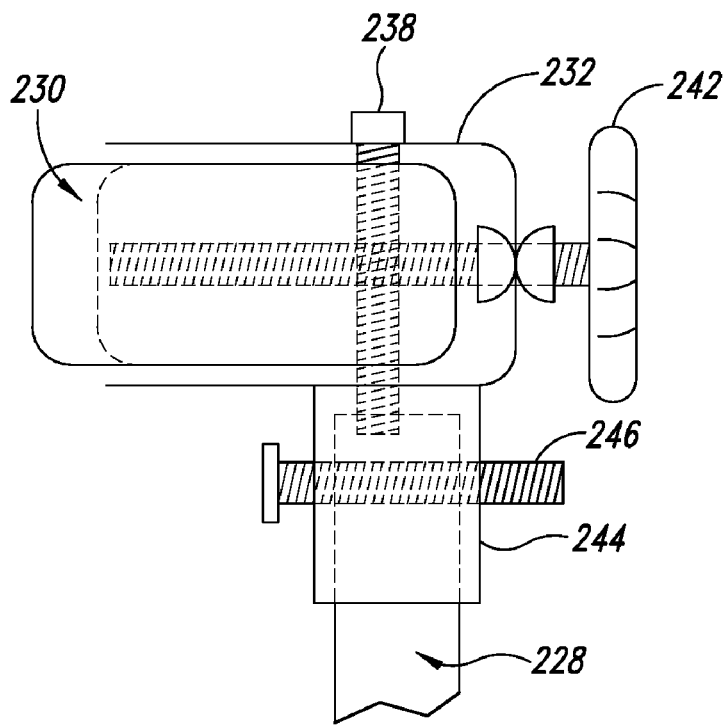
Figure 15E:
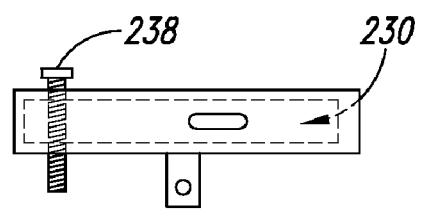
Figure 16A:
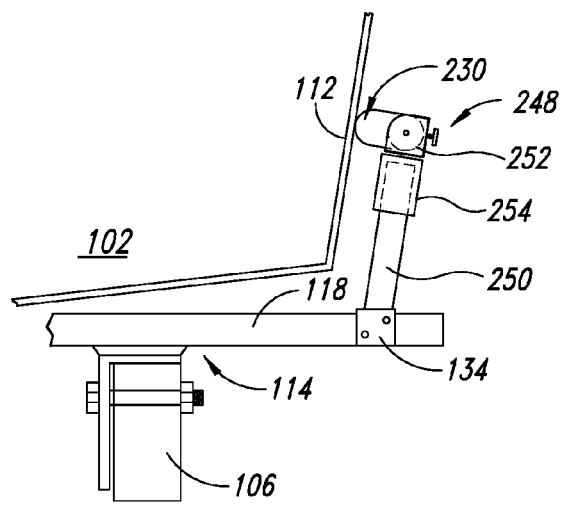
FIGS. 16A-16D are rear, rear, enlarged top, and enlarged top views, respectively, of a further embodiment of the bumper mechanism in accordance with the present disclosure.
Figure 16B:
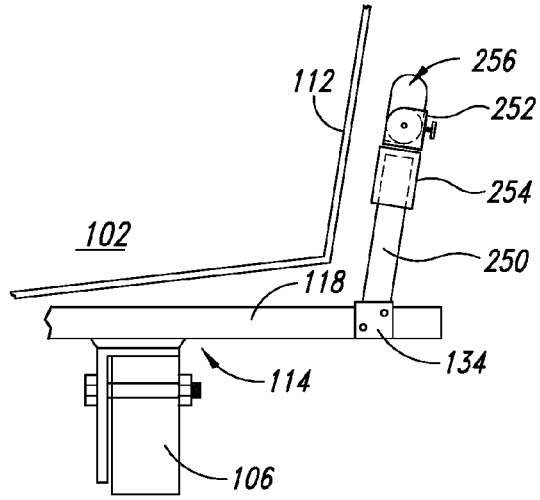
Figure 16C:
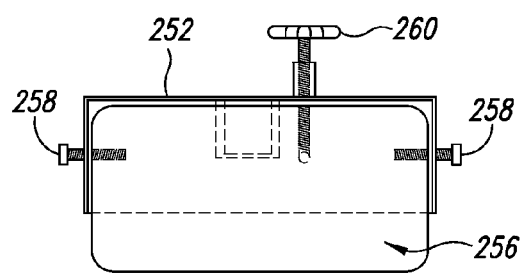
Figure 16D:
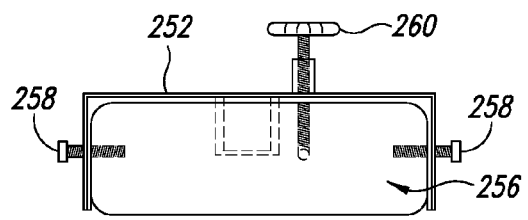

The bracket 232 is affixed to the upright post 228 with a mounting tube 244 that is held in place by a suitable fastener 246 as shown in FIG. 15D. It is to be understood that while a horizontal version of this embodiment is shown in FIGS. 15A-15E, this particular bumper head 230 can be mounted vertically to move about a horizontal axis.

FIGS. 16A-16D illustrate another bumper mechanism 248 attached to an upright support 250 having a lower end attached to or formed with the U-shaped channel 134 that is slideably attached to the horizontal tube 118. Here, a bracket 252 is mounted on the upright support 250 with a mounting tube 254 with appropriate fasteners. The bracket 252 comprises a cradle for holding a rotatable bumper head 256 that rotates about a longitudinal horizontal axis between an engaged position shown in FIG. 16A and a disengaged position shown in FIG. 16B. Corresponding engaged and disengaged positions are shown in top views 16C and 16D, respectively. The bumper head 256 is preferably arcuate at the point it contacts the side of the boat 112 and is formed of appropriate padding or bumper material that will not damage the boat side 112. A pair of pivot pins 258 hold the bumper head 256 in the bracket 252 while permitting it to rotate about the axis defined by the pivot pins 258. A two-position lock bolt 260 attached to an upright wall of the bracket 252 engages and disengages with the rotatable bumper head 256 to hold it in the engaged and disengaged positions.

Figure 17A:
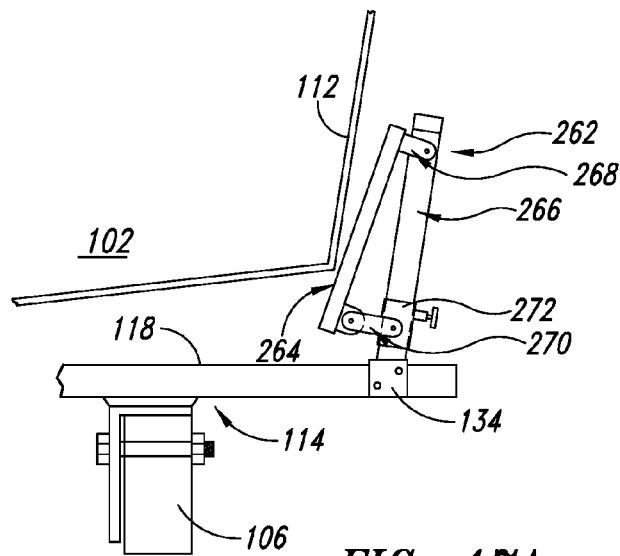
FIGS. 17A-17C are rear, rear, and enlarged cross-sectional rear views, respectively, of still yet a further alternatively embodiment of the bumper mechanism formed in accordance with the present disclosure.
Figure 17B:
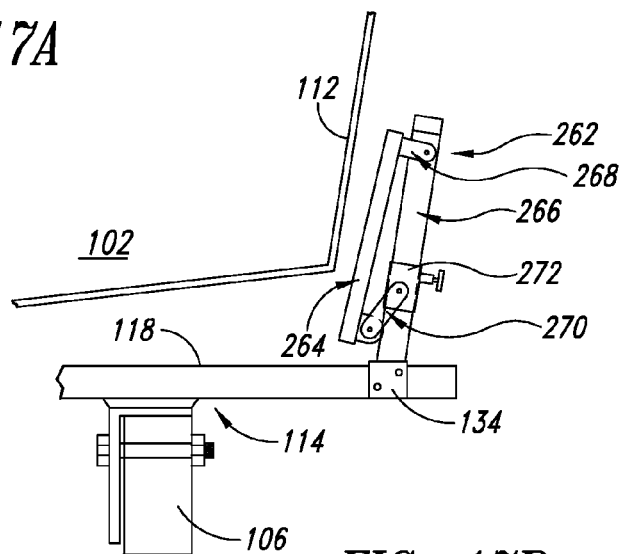
Figure 17C:
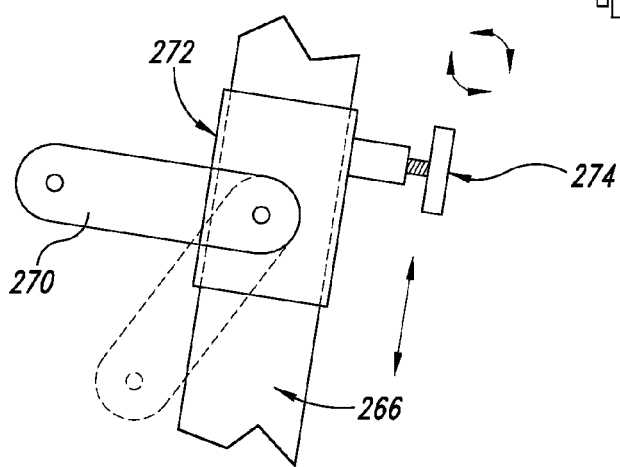

Finally, FIGS. 17A-17C illustrate yet another form of bumper mechanism 262 that includes a vertically oriented bumper post 264 pivotally attached to an upright support 266 at a top end by a bracket 268. The lower end of the bumper pole 264 moves between an engaged position shown in FIG. 17A and a disengaged position shown in FIG. 17B by action of a link 270 pivotally attached at one end to the bumper pole 264 and pivotally attached at another end to a sliding mount 272 that vertically slides on the upright support 266. A threaded locking screw 274 holds the sliding mount 272 in a first position representing the engaged position of the bumper pole 264 as shown in solid lines in FIG. 17C and the disengaged position shown in dashed lines of the link 270 in FIG. 17C.

In all of the foregoing embodiments, it is to be understood that preferably two bumper assemblies are mounted toward the rear of the trailer 102, one on each side rail 106 of the trailer 102. Each of the bumper assemblies is adjustable in its mounting on the trailer to match the width and profile of conventional boat hulls. The device has two limit positions, engaged and disengaged. Both positions are controlled by the afore-described mechanisms to fixedly hold the bumper assembly in either the engaged or disengaged positions.

As previously described, the engaged position is used during loading procedures. This position provides a true centering of the boat with respect to the trailer in its lateral position on the trailer. When loading is complete, the bumper assembly is moved to the disengaged position to bring the device away from the boat hull after the boat and trailer are out of the water. This position ensures there is no wear damage from contact between the boat hull and the bumper assembly during travel.

It is to be understood that various changes may be made in the foregoing embodiments without departing from the scope of the present disclosure. For example, the bumper assembly 262 illustrated in FIGS. 17A-17C can be used in a horizontal orientation as well as the vertical orientation shown in the figures.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the present disclosure have been described herein for purposes of illustration, various modifications may be made without deviating from the spirit and scope of the disclosure. Accordingly, the present disclosure is not limited except as by the appended claims.

The invention claimed is:

1. A device for guiding a boat onto a trailer, the trailer having at least two longitudinal side rails, the device comprising:
   a mounting assembly structured to attach one of the at least two side rails and configured to provide transverse adjustment of the mounting assembly relative to the side rail's longitudinal axis; and
   a bumper assembly attachable to the mounting assembly and having at least one bumper mechanism configured to move between an engaged position, in which the device is structured to guide the boat into an aligned position on the trailer, and a disengaged position, in which the bumper mechanism is structured to be moved away from the boat, the at least one bumper mechanism comprising at least one roller mounted on a slideable bracket, the bumper mechanism structured to move horizontally for transverse movement relative to the side rail's longitudinal axis between the engaged and disengaged positions.

2. The device of claim 1 wherein the bumper mechanism comprises at least one shock absorbing member mounted on the movable bracket.

3. The device of claim 1 wherein the bumper mechanism rotates about a vertical axis.

4. A device for guiding a boat onto a trailer, the trailer having at least two longitudinal side rails, the device comprising:
a mounting assembly structured to attach one of the at least two side rails and configured to provide transverse adjustment of the mounting assembly relative to the side rail's longitudinal axis; and
a bumper assembly attachable to the mounting assembly and having at least one bumper mechanism configured to move between an engaged position, in which the device is structured to guide the boat into an aligned position on the trailer, and a disengaged position, in which the bumper mechanism is structured to be moved away from the boat wherein the bumper mechanism rotates about a vertical axis and comprises a bumper tube slideably mounted over a vertical post and adapted to rotate about the post between the engaged and disengaged positions.

5. The device of claim 4 wherein the bumper mechanism comprises at least one roller mounted on a bracket that in turn is rotatably mounted on a vertical post to rotate the at least one roller bumper between the engaged and disengaged positions.

6. A device for guiding a boat onto a trailer, the trailer having at least two longitudinal side rails, the device comprising:
a mounting assembly structured to attach one of the at least two side rails and configured to provide transverse adjustment of the mounting assembly relative to the side rail's longitudinal axis; and
a bumper assembly attachable to the mounting assembly and having at least one bumper mechanism configured to move between an engaged position, in which the device is structured to guide the boat into an aligned position on the trailer, and a disengaged position, in which the bumper mechanism is structured to be moved away from the boat wherein the bumper mechanism rotates about a vertical axis and comprises a bumper having one end mounted for pivotal movement of a second end between the engaged and disengaged positions.

7. A device for guiding a boat onto a trailer, the trailer having at least two longitudinal side rails, the device comprising:
a mounting assembly structured to attach one of the at least two side rails and configured to provide transverse adjustment of the mounting assembly relative to the side rail's longitudinal axis; and
a bumper assembly attachable to the mounting assembly and having at least one bumper mechanism configured to move between an engaged position, in which the device is structured to guide the boat into an aligned position on the trailer, and a disengaged position, in which the bumper mechanism is structured to be moved away from the boat wherein the bumper mechanism rotates about a vertical axis and comprises a rail mounted to translate longitudinally and to simultaneously move horizontally between the engage and disengaged positions.

8. A boat centering device for a trailer, comprising:
a lever arm having a first end and a second end, the lever arm structured to be mounted on a mount on the trailer to rotate about an axis substantially parallel to the longitudinal axis of the trailer;
a contact member mounted on the first end of the lever arm and structured to be contacted by the boat;
an outrigger mounted on the second end of the lever arm, the outrigger structured to urge the boat towards the longitudinal axis of the trailer when the contact member is in contact with the boat and to not contact the boat when the boat is centered on the trailer; and
a biasing member structured to rotate the lever arm in a direction that will move the contact member upward when the contact member is not in contact with the boat hull.

9. The device of claim 8 wherein the biasing member includes a torsion spring.

10. The device of claim 8 wherein the contact member comprises a support post having a first end adapted for attachment to the first end of the lever arm, and a second end adapted for attachment to a bumper, the bumper mounted at an angle on the support post.

11. The device of claim 10 wherein the support post is adjustable in length.

12. A boat centering device for a trailer, comprising:
a lever arm having a first end and a second end, the lever arm structured to be mounted on a mount on the trailer to rotate about an axis substantially parallel to the longitudinal axis of the trailer;
a contact member mounted on the first end of the lever arm and configured to be contacted by the boat; and
an outrigger mounted on the second end of the lever arm, the outrigger structured to urge the boat towards the longitudinal axis of the trailer when the contact member is in contact with the boat and to not contact the boat when the boat is centered on the trailer wherein a length between the mount and the first end of the lever arm comprises a first length and a length between the second end of the lever arm and the mount comprises a second length, the first length is greater than the second length.

13. The device of claim 12 wherein the first length is adjustable and the second length is adjustable.

14. A boat centering device for a trailer, comprising:
a lever arm having a first end and a second end, the lever arm structured to be mounted on a mount on the trailer to rotate about an axis substantially parallel to the longitudinal axis of the trailer;
a contact member mounted on the first end of the lever arm and configured to be contacted by the boat; and
an outrigger mounted on the second end of the lever arm, the outrigger structured to urge the boat towards the longitudinal axis of the trailer when the contact member is in contact with the boat and to not contact the boat when the boat is centered on the trailer wherein the outrigger includes a bumper having a first side adapted for attachment to the outrigger and a second side adapted for contact with the boat.

15. The device of claim 14 wherein the bumper comprises at least one wedge adapted to expand and contract in size.

16. A boat centering assembly for a trailer, comprising:
at least two independent lever arms, each lever arm having a first end and a second end, the lever arms adapted to rotate in a plane that is substantially perpendicular to the longitudinal axis of the trailer;

at least two bearing members on the first end of each lever arm and configured to rotate the lever arm when contacted by the boat hull;

at least two outriggers mounted on the second end of each lever arm and configured to urge the boat towards the center of the trailer when each lever arm rotates in a first direction; and a respective biasing member associated with each lever arm that biases each lever arm to rotate in a second direction such that the outrigger does not contact the boat hull when the boat is centered on the trailer.

17. The assembly of claim 16 wherein the biasing member includes a torsion spring.

18. The assembly of claim 16 wherein the at least two bearing members include a support post having a first end adapted for attachment to the first end of the lever arm, and a second end adapted for attachment to a bumper, the bumper mounted at an angle on the support post.

19. A boat centering assembly for a trailer, comprising:
means for rotating about an axis substantially parallel to the longitudinal axis of the trailer;
means for contacting the boat, the contacting means mounted on the rotating means;
means for urging the boat towards the longitudinal axis of the trailer when the contacting means is in contact with the boat and to not contact the boat when the boat is centered on the trailer, the urging means mounted on the rotating means; and
further comprising means for biasing the urging means in a direction that will move the contacting means upwards when the contacting means is not in contact with the boat.

20. The assembly of claim 19 wherein the biasing means comprises a torsion spring.

21. The assembly of claim 19 wherein the contacting means comprises a support post having a first end adapted for attachment to the first end of the lever arm, and a second end adapted for attachment to a bumper, the bumper mounted at an angle on the support post.

22. A boat trailer, the trailer having a frame, at least one cross member, at least one bunk mounted to the at least one cross member, at least one axle, a plurality of wheels attached to the at least one axle, a hitch assembly attached to the frame, the improvement comprising:
at least two lever arms, each lever arm having a first end and a second end, the lever arms adapted to rotate in a plane that is substantially perpendicular to the longitudinal axis of the trailer;
at least one bearing member on the first end of each lever arm and configured to rotate the lever arm when contacted by the boat hull;
at least one outrigger mounted on the second end of each lever arm and configured to urge the boat towards the center of the trailer when each lever arm rotates in a first direction; and
a respective biasing member associated with each lever arm that biases each lever arm to rotate in a second direction to move the outrigger away from the boat hull when the boat is centered on the trailer.

\* \* \* \* \*